United States Patent
Wilson et al.

(10) Patent No.: US 6,557,359 B1
(45) Date of Patent: *May 6, 2003

(54) PROCESS FOR HEATING OR COOLING USING MIXTURES OF PENTAFLUOROPROPANE AND A HYDROFLUOROCARBON HAVING 3 TO 6 CARBON ATOMS

(75) Inventors: David P. Wilson, East Amherst, NY (US); Rajiv R. Singh, Getzville, NY (US); Rajat S. Basu, East Amherst, NY (US); Ellen L. Swan, Lancaster, NY (US); David Nalewajek, West Senaca, NY (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/271,043

(22) Filed: Aug. 31, 1998

Related U.S. Application Data

(62) Division of application No. 08/685,821, filed on Jul. 25, 1996, now Pat. No. 5,800,729.
(60) Provisional application No. 60/001,530, filed on Jun. 26, 1995.

(51) Int. Cl.[7] .................................................. F25B 9/00
(52) U.S. Cl. ...................... 62/119; 62/6; 62/86; 62/115; 62/117
(58) Field of Search ................................ 62/117, 6, 86, 62/115, 119

(56) References Cited

U.S. PATENT DOCUMENTS

| | | | |
|---|---|---|---|
| 5,496,866 A | 3/1996 | Sommerfiled et al. | ....... 521/131 |
| 5,562,857 A | 10/1996 | Werner et al. | ................ 252/67 |
| 5,672,294 A | 9/1997 | Lund et al. | ................... 252/67 |
| 5,800,729 A | 9/1998 | Wilson et al. | ............... 521/131 |

FOREIGN PATENT DOCUMENTS

| | | |
|---|---|---|
| WO | WO 9402563 | 2/1994 |
| WO | WO 9422973 | 10/1994 |
| WO | WO 9508603 | 3/1995 |
| WO | WO 9610063 | 4/1996 |

OTHER PUBLICATIONS

Abstract, Database WPI, Week 9521, Derwent Publications Ltd., London, GB, AN 95–159086 & JP, A, 70 082 405 (Matsushita), Mar. 28 1995.

*Primary Examiner*—John M. Cooney, Jr.
(74) *Attorney, Agent, or Firm*—Peters, Verny, Jones & Schmitt, L.L.P.; Howard M. Peters

(57) ABSTRACT

The invention discloses novel azeotrope-like mixtures of fluorinated compounds which are useful for heating and cooling as heat transfer agents and/or refrigerants. The azeotrope-like mixture comprises: (a) pentafluoropropane; and (b) a hydrofluorocarbon of the formula: $C_xF_yH_z$, wherein x is 3, 4, 5, or 6 and y and z are each independently 1 or a positive whole number such that the result of y / (y+z) is greater than 0.67.

12 Claims, No Drawings

PROCESS FOR HEATING OR COOLING USING MIXTURES OF PENTAFLUOROPROPANE AND A HYDROFLUOROCARBON HAVING 3 TO 6 CARBON ATOMS

RELATED APPLICATIONS

This application is a divisional application of U.S. Ser. No. 08/685,821 filed Jul. 25, 1996 now U.S. Pat. No. 5,800,729, issued Sep. 1, 1998, which is a continuation-in-part of U.S. Provisional application, Ser. No. 60/001,530, filed Jul. 26, 1995, both of which are incorporated herein by reference in their entirety.

FIELD OF THE INVENTION

This invention relates to mixtures of pentafluoropropane and a hydrofluorocarbon having 3 to 6 carbon atoms. These mixtures are useful as refrigerants for heating and cooling.

DESCRIPTION OF RELATED ART

Fluorocarbon based fluids have found widespread use in industry for refrigeration applications such as air conditioning and heat pump applications. Vapor compression is one type of refrigeration. In its simplest form, vapor compression involves changing the refrigerant from the liquid to the vapor phase through heat absorption at low pressure and then from the vapor to the liquid phase through heat removal at an elevated pressure.

The primary purpose of refrigeration is to remove energy at low temperature. The primary purpose of a heat pump is to add energy at higher temperature. Heat pumps are considered reverse cycle systems because, for heating, the operation of the condenser is interchanged with that of the refrigeration evaporator.

Certain chlorofluoromethane and chlorofluoroethane derivatives have gained widespread use in refrigeration applications including air conditioning and heat pump applications owing to their unique combination of chemical and physical properties. The majority of refrigerants utilized in vapor compression systems are either single component fluids or azeotropic mixtures. Moreover, certain applications, such as centrifugal chillers, can only use pure or azeotropic refrigerants because non-azeotropic mixtures will separate in pool boiling evaporators resulting in undesirable performance. In other applications, non-azeotropic (or zeotropic) refrigerants may be used.

Azeotropic or azeotrope-like compositions are particularly desirable because they do not fractionate on boiling. This behavior is desirable because in the vapor compression equipment in which these refrigerants are employed, condensed material is generated in preparation for cooling or heating purposes. Unless the refrigerant composition exhibits a constant boiling point, i.e., is azeotrope-like, fractionation and segregation will occur on evaporation and condensation producing undesirable refrigerant distribution which may upset the cooling or heating. If a leak occurs in a refrigeration system during use or service, the composition of the azeotrope-like mixture does not change and, thus, the system pressures and performance remain unaffected.

The art continually seeks new fluorocarbon based azeotrope-like as well as zeotropic mixtures that offer alternatives for refrigeration and heat pump applications. Currently of interest are fluorocarbon based mixtures that are considered to be environmentally safe substitutes for the fully halogenated chlorofluorocarbons (CFC's) presently used that are suspected of causing environmental problems in connection with the earth's protective ozone layer.

The substitute material must also possess those properties unitize to the CFC's being replaced including chemical stability, low toxicity, non-flammability, and efficiency in use. The latter characteristic is important in refrigeration and air conditioning especially where a loss in refrigerant thermodynamic performance or energy efficiency may have secondary environmental impacts through increased fossil fuel use arising from an increased demand for electrical energy. Furthermore, the ideal CFC refrigerant substitute would not require major engineering changes to conventional vapor compression equipment currently used with CFC refrigerants.

Mathematical models have substantiated that hydrofluorocarbons such as pentafluoropropane, including 1,1,2,2,3-pentafluoropropane (HFC-245ca), 1,1,2,3,3-pentafluoropropane (HFC-245ea), 1,1,1,2,3-pentafluoropropane (HFC-245eb), and 1,1,1,3,3-pentafluoropropane (HFC-245fa) will not adversely affect atmospheric chemistry because these hydrofluorocarbons are negligible contributors to ozone depletion and to "greenhouse" global warming in comparison to fully halogenated species.

However, 245eb has been found to have flame limits under normal ambient conditions and HFC-245ca and HFC-245fa have been found to have flame limits under certain conditions. It has not been confirmed whether or not the other pentafluoropropane isomer also exhibits some finite flame propagation behavior in specific environments. This flame propagation behavior would significantly limit the potential use of pentafluoropropane isomers in refrigerant applications.

SUMMARY OF THE INVENTION

In accordance with this invention, novel mixtures have been discovered comprising pentafluoropropane (HFC-245) and a hydrofluorocarbon of the formula $C_xF_yH_z$ wherein x is 3, 4, 5, or 6 and y and z are each independently 1 or a positive whole number such that the product of $y/(y+z)$ is greater than 0.67. Preferably, the 245 isomer is either 245ca or 245fa, most preferably 245fa. A second aspect of this invention is a cooling process in which any of the refrigerants of this invention are condensed and then evaporated in the vicinity of an object to be cooled. Additionally, the same process may be used to heat an object in the vicinity of the condensing refrigerant. Both the heating and cooling processes may be characterized as processes for transferring heat by condensing the refrigerant in a first region to be heated, transferring the refrigerant to a second region to be cooled, and evaporating the refrigerant in the region to be cooled.

The compositions of the invention comprise, consist essentially or consist of azeotrope-like or zeotropic mixtures. Azeotrope-like characteristics are inherent in those compositions in which an azeotropic system exists. In such systems, the precise azeotropic compositions have not been determined but have been ascertained to be within the ranges indicated herein. In general, in such systems, the azeotrope-like compositions exhibit vapor pressures within about ±5 psia and preferably within about ±2 psia (at 0° C.) of the vapor pressure of the true azeotrope (at 0° C.).

DETAILED DESCRIPTION OF THE INVENTION AND PREFERRED EMBODIMENTS

The following discussion relates to those compositions which are azeotrope-like.

From fundamental principles, the thermodynamic state of a fluid is defined by four variables: pressure, temperature, liquid composition and vapor composition, P, T, X, and Y, respectively. An azeotrope is a unique characteristic of a system of two or more components in which X and Y are equal at the state P and T. In practice, this means that the components of a mixture cannot be separated during a phase change and, therefore, are useful in cooling and heating applications. Azeotrope-like means that the composition behaves like an azeotrope, i.e., has constant boiling characteristics or a tendency not to fractionate on boiling or evaporation. In such compositions, the composition of the vapor formed during boiling or evaporation is identical or substantially identical to the original liquid composition. During boiling or evaporation, the liquid composition changes, if at all, only minimally. In contrast, non-azeotrope-like compositions change to a substantial degree during boiling or evaporation.

The azeotrope-like compositions of this invention exhibit essentially constant vapor pressure characteristics as the liquid mixture is evaporated and show relatively minor shifts in composition during evaporation. Thus, the compositions are advantageously used in a vapor compression cycle because they mimic the performance of a constant boiling single component or azeotropic mixture refrigerant.

Another characteristic of azeotrope-like compositions is that there is a range of compositions containing the same components in varying proportions that are azeotrope-like or constant boiling. All such compositions are intended to be covered by the terms "azeotrope-like" or "constant boiling" as used herein. As an example, it is well known that at differing pressures, the composition of a given azeotrope will vary at least slightly as does the boiling point of the composition. Thus, an azeotrope of A and B represents a unique relationship, but with a variable composition depending on temperature and/or pressure. As is readily understood by persons ordinarily skilled in the art, the boiling point of the azeotrope will vary with the pressure.

The compositions of this invention may include additional components. In the embodiment where azeotrope-like compositions are involved, the preferred additional components are those which do not form new azeotropic or azeotrope-like systems. In other words, additional components that are not present in a first distillation cut taken. One way to determine whether the addition of a component forms a new azeotropic or azeotrope-like system is to distill a sample of the system under conditions, such as with reflux, that would be expected to separate the mixture into its separate components. If the mixture containing the additional component is non-azeotropic or non-azeotrope-like, the additional component will fractionate from the azeotropic or azeotrope-like components. If the mixture is azeotrope-like, some finite amount of a first distillation cut will be obtained that contains all of the mixture components and is constant boiling or behaves as a single substance. As used herein, "first distillation cut" means the first cut taken after the distillation column displays the steady state operation under total reflux conditions.

The additional components that may be used include those components added to tailor the properties of the composition to the end use. For example, it is known to add propane to refrigerant compositions to aid solubility, with commercial refrigeration lubricants. Other suitable additional components will be readily apparent to those ordinarily skilled in the art.

As such, the present invention meets the need in the art for a refrigerant that has a low ozone depletion potential and is a negligible contributor to global warming compared to fully halogenated CFC refrigerants. Further, the compositions of the invention are nonflammable, have a coefficient of performance and capacity suitable for use as replacement refrigerants, and have low compressor discharge temperatures. In one process embodiment of the invention, the compositions of the invention may be used in a method for producing refrigeration that comprises condensing a refrigerant comprising the compositions of the invention and, subsequently, evaporating the refrigerant in the vicinity of a body to be cooled. Alternatively, the compositions of this invention may be used in a method for producing heating that comprises condensing a refrigerant composition comprising the compositions of this invention in the vicinity of a body to be heated and then evaporating the refrigerant.

The compositions of this invention may also be used as heat transfer fluids. For example, in certain refrigeration systems, it is desirable to operate the system at a specific temperature. However, maintaining the desired temperature may require the addition or removal of heat. Thus, a secondary heating loop containing an appropriate heat transfer fluid may be added. The heat transfer fluid absorbs heat in one part of the cycle and transfers the heat to another part of the cycle without changing state when the heat transferred is sensible heat, or by changing state when the heat transferred is latent heat.

In another process embodiment of the invention, the compositions of this invention are used in a method for producing polyurethane and polyisocyanurate foams. The method comprises reacting and foaming a mixture of ingredients that forms the polyurethane and polyisocyanurate foams in the presence of a volatile blowing agent comprising the compositions of this invention. The blowing agents of this invention are used alone or in a premix with a polyol. The premix comprises the compositions of this invention prior to reaction and foaming of the ingredients forming polyurethane and polyisocyanurate foams. Suitable polyols for the premix are known in the art, for example in U.S. Pat. No. 5,130, 345 incorporated in its entirety herein by reference.

In yet another process embodiment, the compositions of this invention may be used in a method for producing foam comprising blending heat plasticized resin with a volatile blowing agent comprising the compositions of this invention and introducing the resin/volatile blowing agent blend into a zone of lower pressure to cause foaming. The compositions of this invention may also be used in a method of dissolving contaminants or removing contaminants from the surface of a substrate. This use comprises the step of contacting the substrate with the compositions. The compositions of this invention may also be used as fire extinguishing agents or as volatile carrier fluids or propellants in aerosol formulations.

Preferably, the materials used to form the compositions of this invention are used in sufficiently high purity so as to avoid the introduction of adverse influences on the cooling or heating properties or constant boiling properties of the azeotrope-like embodiments of the invention. The invention is illustrated in the following Tables 1 through 4. With respect to these Tables, it is to be understood that the specified composition weight percentages are prefaced by the term "about"; and NBP refers to the normal boiling point; VP refers to vapor pressure equal to 0.99 atm and also the chemical structures are shown with letters and numbers with the understanding that in these structures, the capital letters are on the line and the numbers are in subscript to create the standard chemical formula notation.

These mixtures are used in conventional heating and/or cooling equipment as is described in numerous U.S. patents and published articles.

In a preferred embodiment, the azeotrope-like mixture comprises 1,1,2,2,3-pentafluoropropane, and the hydrofluorocarbon which is independently selected from the 245ca components of Table 1, and is present in the mixture at or between the upper and lower values by weight percent for the preferred, more preferred or most preferred ranges as shown in Table 1.

In a preferred embodiment, the azeotrope-like mixture comprises 1,1,2,3,3-pentafluoropropane, and the hydrofluorocarbon is independently selected from the 245ea azeotrope components of Table 2 is present in the mixture at or between the upper and lower values by weight percent for the preferred, more preferred, or most preferred ranges as shown in Table 2.

In a preferred embodiment, the azeotrope-like mixture comprises 1,1,1,2,3-pentafluoropropane, and the hydrofluorocarbon is independently selected from the 245eb azeotrope components of Table 3 is present in the mixture at or between the upper and lower values by weight percent for the preferred, more preferred, or most preferred ranges shown in Table 3.

In a preferred embodiment, the azeotrope-like mixture comprises 1,1,1,3,3-pentafluoropropane, and the hydrofluorocarbon is independently selected from the 245fa azeotrope components of Table 4 is present in the mixture at or between the upper and lower values by weight percent for the preferred, more preferred, or most preferred ranges as shown in Table 4.

TABLE 1

| 245ca azeotropes at 25° C. NBP = 25.4° C. | VP = 0.99 atm | 245ca Preferred Compositions (wt. %) | | 245ca More preferred Compositions (wt. %) | | 245ca Most preferred Compositions (wt. %) | | Azeo NBP |
|---|---|---|---|---|---|---|---|---|
| STRUCTURE | est. BP (° C.) | Upper | Lower | Upper | Lower | Upper | Lower | (±1) |
| CF3CF2CF2CH2CH3 | 46.3 | 51 | 99 | 61 | 99 | 70 | 89 | 20 |
| CF3CF2CH2CF2CH3 | 59.4 | 57 | 99 | 67 | 99 | 75 | 91 | 22 |
| CF3CF2CHFCHFCH3 | 61.7 | 58 | 99 | 68 | 99 | 76 | 91 | 23 |
| CF2CH2CF2CF2CH3 | 67.2 | 60 | 99 | 70 | 99 | 77 | 92 | 23 |
| CF3CHFCF2CHFCH3 | 68 | 60 | 99 | 70 | 99 | 77 | 92 | 23 |
| CF3CHFCHFCF2CH3 | 72.9 | 62 | 99 | 72 | 99 | 79 | 92 | 24 |
| CF3CF2CHFCH2CH2F | 70 | 61 | 99 | 71 | 99 | 78 | 92 | 24 |
| CF3CF2CH2CHFCH2F | 75.2 | 63 | 99 | 73 | 99 | 80 | 93 | 24 |
| CF3CHFCF2CH2CH2F | 76.8 | 64 | 99 | 74 | 99 | 80 | 93 | 24 |
| CF3CHFCH2CF2CH2F | 83.1 | 66 | 99 | 76 | 99 | 82 | 93 | 24 |
| CF3CF2CH2CHFCH2F | 84.2 | 66 | 99 | 76 | 99 | 82 | 93 | 24 |
| CF3CH2CHFCF2CH2F | 85.4 | 67 | 99 | 77 | 99 | 82 | 93 | 24 |
| CF3CHFCHFCHFCH2F | 89.1 | 68 | 99 | 78 | 99 | 83 | 94 | 24 |
| CF3CF2CH2CH2CHF2 | 72.5 | 62 | 99 | 72 | 99 | 79 | 92 | 24 |
| CF3CH2CH2CF2CHF2 | 80.4 | 65 | 99 | 75 | 99 | 81 | 93 | 24 |
| CF3CH2CF2CH2CHF2 | 82 | 65 | 99 | 75 | 99 | 81 | 93 | 24 |
| CF3CHFCHFCH2CHF2 | 86.5 | 67 | 99 | 77 | 99 | 82 | 93 | 24 |
| CF3CHFCH2CHFCHF2 | 87.7 | 67 | 99 | 77 | 99 | 83 | 94 | 24 |
| CF3CH2CHFCHFCHF2 | 90.4 | 68 | 99 | 78 | 99 | 83 | 94 | 24 |
| CF3CH2CH2CHFCF3 | 72.9 | 62 | 99 | 72 | 99 | 79 | 92 | 24 |
| CF3CH2CHFCH2CF3 | 75.7 | 63 | 99 | 73 | 99 | 80 | 93 | 24 |
| CH2FCF2CF2CF2CH3 | 65.4 | 59 | 99 | 69 | 99 | 77 | 92 | 24 |
| CH2FCH2CF2CF2CHF2 | 79.7 | 65 | 99 | 75 | 99 | 81 | 93 | 24 |
| CH2FCF2CF2CH2CHF2 | 87.1 | 67 | 99 | 77 | 99 | 83 | 94 | 24 |
| CH2FCF2CH2CF2CHF2 | 87.2 | 67 | 99 | 77 | 99 | 83 | 94 | 24 |
| CH2FCHFCHFCF2CHF2 | 92.8 | 69 | 99 | 79 | 99 | 84 | 94 | 24 |
| CH2FCHFCF2CHFCHF2 | 95 | 70 | 99 | 80 | 99 | 84 | 94 | 24 |
| CH2FCF2CHFCHFCHF2 | 96.6 | 70 | 99 | 80 | 99 | 85 | 94 | 24 |
| CHF2CF2CF2CHFCH3 | 69.2 | 61 | 99 | 71 | 99 | 78 | 92 | 23 |
| CHF2CF2CHFCF2CH3 | 74.8 | 63 | 99 | 73 | 99 | 79 | 92 | 24 |
| CHF2CF2CHFCF2CH3 | 76.3 | 63 | 99 | 73 | 99 | 80 | 93 | 24 |
| CHF2CF2CHFCH2CHF2 | 91.9 | 69 | 99 | 79 | 99 | 84 | 94 | 24 |
| CHF2CHFCF2CH2CHF2 | 94.6 | 70 | 99 | 80 | 99 | 84 | 94 | 24 |
| CHF2CF2CH2CHFCHF2 | 93.6 | 69 | 99 | 79 | 99 | 84 | 94 | 24 |
| CHF2CHFCHFCHFCHF2 | 103.4 | 72 | 99 | 82 | 99 | 86 | 95 | 24 |
| CH2FCHFCF2CF2CH2F | 85.8 | 67 | 99 | 77 | 99 | 82 | 93 | 24 |
| CH2FCF2CHFCF2CH2F | 88.1 | 67 | 99 | 77 | 99 | 83 | 94 | 24 |
| CF3CH2CH2CF3 | 40.7 | 52 | 99 | 62 | 99 | 72 | 90 | 20 |
| CF3CHFCH2CHF2 | 50.8 | 57 | 99 | 67 | 99 | 75 | 91 | 21 |
| CF3CH2CHFCHF2 | 53 | 58 | 99 | 68 | 99 | 76 | 91 | 21 |
| CF3CF2CH2CH2F | 37.3 | 51 | 99 | 61 | 99 | 70 | 89 | 20 |
| CF3CHFCHFCH2F | 50.8 | 57 | 99 | 67 | 99 | 75 | 91 | 21 |
| CF3CH2CF2CH2F | 45.8 | 55 | 99 | 65 | 99 | 73 | 90 | 20 |
| CHF2CH2CF2CHF2 | 55.7 | 59 | 99 | 69 | 99 | 77 | 92 | 22 |
| CHF2CHFCHFCHF2 | 65.1 | 63 | 99 | 73 | 99 | 80 | 93 | 23 |
| CHF2CF2CHFCH2F | 55.3 | 59 | 99 | 69 | 99 | 77 | 92 | 22 |
| CHF2CHFCF2CH2F | 57.5 | 60 | 99 | 70 | 99 | 77 | 92 | 22 |
| CH2FCF2CF2CH2F | 49.2 | 57 | 99 | 67 | 99 | 75 | 91 | 21 |
| CHF2CF2CF2CH3 | 35.8 | 50 | 99 | 60 | 99 | 70 | 89 | 20 |
| CF3CF2CHFCH3 | 26 | 45 | 95 | 55 | 95 | 65 | 85 | 19 |
| CF3CHFCF2CH3 | 32 | 48 | 95 | 58 | 95 | 67 | 86 | 20 |
| CF3CHFCHFCF2CHFCH2F | 120.9 | 72 | 99 | 82 | 99 | 86 | 95 | 24 |
| CF3CH2CF2CF2CHFCH2F | 112.7 | 70 | 99 | 80 | 99 | 85 | 94 | 24 |
| CF3CF2CHFCH2CF2CH2F | 106.9 | 68 | 99 | 78 | 99 | 84 | 94 | 24 |

TABLE 1-continued

| 245ca azeotropes at 25° C. NBP = 25.4° C. STRUCTURE | VP = 0.99 atm est. BP (° C.) | 245ca Preferred Compositions (wt. %) | | 245ca More preferred Compositions (wt. %) | | 245ca Most preferred Compositions (wt. %) | | Azeo NBP (±1) |
|---|---|---|---|---|---|---|---|---|
| | | Upper | Lower | Upper | Lower | Upper | Lower | |
| CF3CHFCF2CH2CF2CH2F | 111.2 | 70 | 99 | 80 | 99 | 84 | 94 | 24 |
| CF3CF2CH2CHFCF2CH2F | 110.3 | 69 | 99 | 79 | 99 | 84 | 94 | 24 |
| CF3CHFCHFCHFCF2CH2F | 121.8 | 72 | 99 | 82 | 99 | 87 | 95 | 24 |
| CF3CH2CF2CFHCF2CH2F | 114.2 | 70 | 99 | 80 | 99 | 85 | 94 | 24 |
| CF3CHFCH2CF2CF2CH2F | 113.4 | 70 | 99 | 80 | 99 | 85 | 94 | 24 |
| CF3CH2CHFCF2CF2CH2F | 113.1 | 70 | 99 | 80 | 99 | 85 | 94 | 24 |
| CF3CHFCH2CF2CHFCHF2 | 120.9 | 72 | 99 | 82 | 99 | 86 | 95 | 24 |
| CF3CH2CHFCF2CHFCHF2 | 122.2 | 72 | 99 | 82 | 99 | 87 | 95 | 24 |
| CF2CF2CH2CH2CF2CHF2 | 104.6 | 68 | 99 | 78 | 99 | 83 | 94 | 24 |
| CF3CHFCHFCH2CF2CHF2 | 117.8 | 71 | 99 | 81 | 99 | 86 | 95 | 24 |
| CF3CH2CF2CH2CF2CHF2 | 112.4 | 70 | 99 | 80 | 99 | 85 | 94 | 24 |
| CF3CHFCH2CHFCF2CHF2 | 117.3 | 71 | 99 | 81 | 99 | 86 | 95 | 24 |
| CF3CH2CH2CF2CF2CHF2 | 107.3 | 68 | 99 | 78 | 99 | 84 | 94 | 24 |
| CF3CH2CHFCHFCF2CHF2 | 119.2 | 72 | 99 | 82 | 99 | 86 | 95 | 24 |
| CF3CF2CF2CF2CH2CH3 | 71.4 | 56 | 99 | 66 | 99 | 74 | 91 | 24 |
| CF3CF2CF2CHFCHFCH3 | 86 | 62 | 99 | 72 | 99 | 78 | 92 | 24 |
| CF3CF2CHFCF2CHFCH3 | 93.5 | 64 | 99 | 74 | 99 | 80 | 93 | 24 |
| CF3CHFCF2CF2CHFCH3 | 94.9 | 65 | 99 | 75 | 99 | 81 | 93 | 24 |
| CF3CF2CF2CH2CF2CH3 | 82.8 | 60 | 99 | 70 | 99 | 78 | 92 | 24 |
| CF3CF2CHFCHFCF2CH3 | 97.5 | 65 | 99 | 75 | 99 | 81 | 93 | 24 |
| CF3CHFCF2CHFCF2CH3 | 99.6 | 66 | 99 | 76 | 99 | 82 | 93 | 24 |
| CF3CF2CH2CF2CF2CH3 | 93 | 64 | 99 | 74 | 99 | 80 | 93 | 24 |
| CF3CHFCHFCF2CF2CH3 | 102.3 | 67 | 99 | 77 | 99 | 82 | 93 | 24 |
| CF3CH2CF2CF2CF2CH3 | 92.4 | 64 | 99 | 74 | 99 | 80 | 93 | 24 |
| CHF2CF2CF2CHFCH2CHF2 | 117.8 | 71 | 99 | 81 | 99 | 86 | 95 | 24 |
| CHF2CF2CHFCF2CH2CHF2 | 122.4 | 72 | 99 | 82 | 99 | 87 | 95 | 24 |
| CHF2CHFCF2CF2CH2CHF2 | 123.1 | 73 | 99 | 83 | 99 | 87 | 95 | 24 |
| CF3CF2CHFCH2CHFCHF2 | 120.4 | 72 | 99 | 82 | 99 | 86 | 95 | 24 |
| CHF2CF2CHFCHFCHFCHF2 | 132.1 | 75 | 99 | 85 | 99 | 88 | 95 | 24 |
| CHF2CHFCF2CHFCHFCHF2 | 133.5 | 75 | 99 | 85 | 99 | 89 | 96 | 24 |
| CGF2CF2CH2CH2CHFCHF2 | 124.9 | 73 | 99 | 83 | 99 | 87 | 95 | 24 |
| CHF2CF2CHFCH2CF2CHF2 | 123.1 | 73 | 99 | 83 | 99 | 87 | 95 | 24 |
| CHF2CF2CF2CF2CH2CH2F | 104.8 | 68 | 99 | 78 | 99 | 83 | 94 | 24 |
| CHF2CF2CF2CHFCHFCH2F | 118.7 | 72 | 99 | 82 | 99 | 86 | 95 | 24 |
| CHF2CF2CHFCF2CHFCH2F | 122.9 | 73 | 99 | 83 | 99 | 87 | 95 | 24 |
| CHF2CHFCF2CF2CHFCH2F | 121.8 | 72 | 99 | 82 | 99 | 87 | 95 | 24 |
| CHF2CF2CF2CH2CF2CH2F | 114.1 | 70 | 99 | 80 | 99 | 85 | 94 | 24 |
| CHF2CF2CHFCHFCF2CH2F | 125.4 | 73 | 99 | 83 | 99 | 87 | 95 | 24 |
| CHF2CHFCF2CHFCF2CH2F | 125 | 73 | 99 | 83 | 99 | 87 | 95 | 24 |
| CHF2CF2CH2CF2CF2CH2F | 117.5 | 71 | 99 | 81 | 99 | 86 | 95 | 24 |
| CHF2CHFCHFCF2CF2CH2F | 124.2 | 73 | 99 | 83 | 99 | 87 | 95 | 24 |
| CHF2CH2CF2CF2CF2CH2F | 112.2 | 70 | 99 | 80 | 99 | 85 | 94 | 24 |
| CF2HCF2CF2CF2CHFCH3 | 94.4 | 64 | 99 | 74 | 99 | 81 | 93 | 24 |
| CF2HCF2CF2CHFCF2CH3 | 100.8 | 67 | 99 | 77 | 99 | 82 | 93 | 24 |
| CHF2CF2CHFCF2CF2CH3 | 104.2 | 68 | 99 | 78 | 99 | 83 | 94 | 24 |
| CHF2CHFCF2CF2CF2CH3 | 101.4 | 67 | 99 | 77 | 99 | 82 | 93 | 24 |
| CH2FCF2CF2CF2CF2CH3 | 90.6 | 63 | 99 | 73 | 99 | 80 | 93 | 24 |
| CH2FCF2CF2CF2CHFCH2F | 110.9 | 69 | 99 | 79 | 99 | 84 | 94 | 24 |
| CH2FCF2CF2CHFCF2CH2F | 115.9 | 71 | 99 | 81 | 99 | 85 | 94 | 24 |
| CF3CH2CH2CHFCF2CF3 | 96.7 | 65 | 99 | 75 | 99 | 81 | 93 | 24 |
| CF3CH2CH2CF2CHFCF3 | 104.4 | 68 | 99 | 78 | 99 | 83 | 94 | 24 |
| CF3CF2CH2CH2CHFCF3 | 100.7 | 66 | 99 | 76 | 99 | 82 | 93 | 24 |
| CF3CHFCHFCHFCH2CF3 | 115.5 | 71 | 99 | 81 | 99 | 85 | 94 | 24 |
| CF3CH2CF2CHFCH2CF3 | 111.4 | 70 | 99 | 80 | 99 | 84 | 94 | 24 |
| CF3CHFCH2CF2CH2CF3 | 108.4 | 69 | 99 | 79 | 99 | 84 | 94 | 24 |
| CF3CHFCH2CH2CF2CF3 | 97.1 | 65 | 99 | 75 | 99 | 81 | 93 | 24 |
| CF3CHFCHFCH2CHFCF3 | 112 | 70 | 99 | 80 | 99 | 85 | 94 | 24 |
| CF3CF2CF2CH2CH2CHF2 | 95.9 | 65 | 99 | 75 | 99 | 81 | 93 | 24 |
| CF3CF2CHFCHFCH2CHF2 | 111.2 | 70 | 99 | 80 | 99 | 84 | 94 | 24 |
| CF3CHFCF2CHFCH2CHF2 | 116.6 | 71 | 99 | 81 | 99 | 86 | 95 | 24 |
| CF3CF2CH2CF2CH2CHF2 | 107.9 | 69 | 99 | 79 | 99 | 84 | 94 | 24 |
| CF3CHFCHFCF2CH2CHF2 | 120.5 | 72 | 99 | 82 | 99 | 86 | 95 | 24 |
| CF3CH2CF2CF2CH2CHF2 | 114 | 70 | 99 | 80 | 99 | 85 | 94 | 24 |
| CF3CHFCH2CHFCHFCHF2 | 111.5 | 70 | 99 | 80 | 99 | 84 | 94 | 24 |
| CF3CHFCF2CH2CHFCHF2 | 117.4 | 71 | 99 | 81 | 99 | 86 | 95 | 24 |
| CF3CF2CH2CHFCHFCHF2 | 115.4 | 71 | 99 | 81 | 99 | 85 | 94 | 24 |
| CF3CHFCHFCHFCHFCHF2 | 128.5 | 74 | 99 | 84 | 99 | 88 | 95 | 24 |
| CF3CH2CF2CHFCHFCHF2 | 122.7 | 73 | 99 | 83 | 99 | 87 | 95 | 24 |
| CF3CF2CF2CHFCH2CH2F | 94.3 | 64 | 99 | 74 | 99 | 81 | 93 | 24 |
| CF3CF2CHFCF2CH2CH2F | 102.3 | 67 | 99 | 77 | 99 | 82 | 93 | 24 |
| CF3CHFCF2CF2CH2CH2F | 105.3 | 68 | 99 | 78 | 99 | 83 | 94 | 24 |
| CF3CF2CF2CH2CHFCH2F | 98.6 | 66 | 99 | 76 | 99 | 82 | 93 | 24 |
| CF3CF2CHFCHFCH2CH2F | 113.8 | 70 | 99 | 80 | 99 | 85 | 94 | 24 |
| CF3CHFCF2CHFCHFCH2F | 117.5 | 71 | 99 | 81 | 99 | 86 | 95 | 24 |

TABLE 1-continued

| 245ca azeotropes at 25° C. NBP = 25.4° C. STRUCTURE | VP = 0.99 atm est. BP (° C.) | 245ca Preferred Compositions (wt. %) | | 245ca More preferred Compositions (wt. %) | | 245ca Most preferred Compositions (wt. %) | | Azeo NBP (±1) |
|---|---|---|---|---|---|---|---|---|
| | | Upper | Lower | Upper | Lower | Upper | Lower | |
| CF3CF2CH2CF2CHFCH2F | 110 | 69 | 99 | 79 | 99 | 84 | 94 | 24 |
| CH3CHFCF2CF2CF3 | 50.2 | 50 | 99 | 60 | 99 | 70 | 89 | 22 |
| CH3CF2CFHCF2CF3 | 57.5 | 54 | 99 | 64 | 99 | 73 | 90 | 22 |
| CH3CF2CF2CHFCF3 | 60.9 | 55 | 99 | 65 | 99 | 74 | 91 | 23 |
| CH2FCH2CF2CF2CF3 | 60.7 | 55 | 99 | 65 | 99 | 74 | 91 | 23 |
| CH2FCHFCHFCF2CF3 | 75.5 | 61 | 99 | 71 | 99 | 78 | 92 | 24 |
| CH2FCHFCF2CHFCF3 | 80.1 | 63 | 99 | 73 | 99 | 79 | 92 | 24 |
| CH2FCF2CH2CF2CF3 | 71.6 | 60 | 99 | 70 | 99 | 77 | 92 | 24 |
| CH2FCF2CHFCHFCF3 | 83.5 | 64 | 99 | 74 | 99 | 80 | 93 | 24 |
| CH2FCF2CF2CH2CF3 | 76.1 | 61 | 99 | 71 | 99 | 78 | 92 | 24 |
| CF2HCH2CHFCF2CF3 | 74.6 | 61 | 99 | 71 | 99 | 78 | 92 | 24 |
| CF2HCH2CF2CHFCF3 | 79.7 | 63 | 99 | 73 | 99 | 79 | 92 | 24 |
| CF2HCHFCH2CF2CF3 | 77.9 | 62 | 99 | 72 | 99 | 79 | 92 | 24 |
| CF2HCHFCHFCHFCF3 | 90.2 | 66 | 99 | 76 | 99 | 82 | 93 | 24 |
| CF2HCHFCF2CH2CF3 | 83.5 | 64 | 99 | 74 | 99 | 80 | 93 | 24 |
| CF2HCF2CH2CFHCF3 | 82 | 63 | 99 | 73 | 99 | 80 | 93 | 24 |
| CF2HCF2CHFCH2CF3 | 82.6 | 64 | 99 | 74 | 99 | 80 | 93 | 24 |
| CF3CH2CH2CF2CF3 | 64.8 | 57 | 99 | 67 | 99 | 75 | 91 | 24 |
| CF3CH2CHFCHFCF3 | 77.2 | 62 | 99 | 72 | 99 | 79 | 92 | 24 |
| CF3CH2CF2CH2CF3 | 71 | 59 | 99 | 69 | 99 | 77 | 92 | 24 |
| CF3CHFCH2CHFCF3 | 76.2 | 61 | 99 | 71 | 99 | 78 | 92 | 24 |
| CH2FCF2CHFCF2CF2H | 85.4 | 65 | 99 | 75 | 99 | 81 | 93 | 24 |
| CH2FCF2CF2CHFCF2H | 85.2 | 65 | 99 | 75 | 99 | 81 | 93 | 24 |
| CH2FCHFCF2CF2CF2H | 81.3 | 63 | 99 | 73 | 99 | 80 | 93 | 24 |
| CH3CF2CF2CF2CF2H | 60.9 | 55 | 99 | 65 | 99 | 74 | 91 | 23 |
| CF2HCH2CF2CF2CF2H | 82.6 | 64 | 99 | 74 | 99 | 80 | 93 | 24 |
| CF2HCHFCHFCF2CF2H | 93.8 | 67 | 99 | 77 | 99 | 83 | 94 | 24 |
| CF2HCHFCF2CHFCF2H | 94.3 | 68 | 99 | 78 | 99 | 83 | 94 | 24 |
| CF2HCF2CH2CF2CF2H | 86.1 | 65 | 99 | 75 | 99 | 81 | 93 | 24 |
| CH2FCF2CF2CF2CH2F | 74.3 | 61 | 99 | 71 | 99 | 78 | 92 | 24 |
| CF3CF2CF2CH2CH2CF3 | 88.3 | 61 | 99 | 71 | 99 | 78 | 92 | 24 |
| CF3CF2CHFCHFCH2CF3 | 101.9 | 65 | 99 | 75 | 99 | 81 | 93 | 24 |
| CF3CHFCF2CHFCH2CF3 | 107.3 | 67 | 99 | 77 | 99 | 82 | 93 | 24 |
| CF3CF2CH2CF2CH2CF3 | 96.9 | 64 | 99 | 74 | 99 | 80 | 93 | 24 |
| CF3CHFCHFCF2CH2CF3 | 109.5 | 68 | 99 | 78 | 99 | 83 | 94 | 24 |
| CF3CH2CF2CF2CH2CF3 | 103 | 66 | 99 | 76 | 99 | 81 | 93 | 24 |
| CF3CHFCH2CHFCF2CF3 | 100 | 65 | 99 | 75 | 99 | 81 | 93 | 24 |
| CF3CHFCH2CF2CHFCF3 | 10.6 | 26 | 99 | 36 | 99 | 52 | 83 | 24 |
| CF3CHFCHFCH2CF2CF3 | 102.2 | 65 | 99 | 75 | 99 | 81 | 93 | 24 |
| CF3CHFCHFCHFCHFCF3 | 115.3 | 69 | 99 | 79 | 99 | 84 | 94 | 24 |
| CF3CF2CH2CH2CF2CF3 | 89 | 61 | 99 | 71 | 99 | 78 | 92 | 24 |
| CF3CF2CF2CHFCH2CHF2 | 98.8 | 64 | 99 | 74 | 99 | 80 | 93 | 24 |
| CF3CHFCF2CF2CH2CHF2 | 105.1 | 66 | 99 | 76 | 99 | 82 | 93 | 24 |
| CF3CHFCF2CF2CHFCHF2 | 108.2 | 67 | 99 | 77 | 99 | 83 | 94 | 24 |
| CF3CF2CF2CH2CHFCHF2 | 101.4 | 65 | 99 | 75 | 99 | 81 | 93 | 24 |
| CF3CF2CHFCHFCHFCHF2 | 114.8 | 69 | 99 | 79 | 99 | 84 | 94 | 24 |
| CF3CHFCF2CHFCHFCHF2 | 118.6 | 70 | 99 | 80 | 99 | 85 | 94 | 24 |
| CF3CF2CH2CF2CHFCHF2 | 109.4 | 68 | 99 | 78 | 99 | 83 | 94 | 24 |
| CF3CHFCHFCF2CHFCHF2 | 120.3 | 71 | 99 | 81 | 99 | 85 | 94 | 24 |
| CF3CH2CF2CF2CHFCHF2 | 112.1 | 68 | 99 | 78 | 99 | 83 | 94 | 24 |
| CF3CF2CHFCH2CF2CHF2 | 105.8 | 66 | 99 | 76 | 99 | 82 | 93 | NBP |
| CF3CHFCF2CH2CF2CHF2 | 110.1 | 68 | 99 | 78 | 99 | 83 | 94 | 24 |
| CF3CF2CH2CHFCF2CHF2 | 107.5 | 67 | 99 | 77 | 99 | 82 | 93 | 24 |
| CF3CHFCHFCHFCF2CHF2 | 118.9 | 70 | 99 | 80 | 99 | 85 | 94 | 24 |
| CF3CH2CF2CHFCF2CHF2 | 111.4 | 68 | 99 | 78 | 99 | 83 | 94 | 24 |
| CF3CHFCH2CF2CF2CHF2 | 108.9 | 67 | 99 | 77 | 99 | 83 | 94 | 24 |
| CF3CH2CHFCF2CF2CHF2 | 108.5 | 67 | 99 | 77 | 99 | 83 | 94 | 24 |
| CF3CF2CF2CF2CH2CH2F | 85.8 | 60 | 99 | 70 | 99 | 77 | 92 | 24 |
| CF3CF2CF2CHFCHFCH2F | 99.7 | 65 | 99 | 75 | 99 | 81 | 93 | 24 |
| CF3CF2CHFCF2CHFCH2F | 105.6 | 66 | 99 | 76 | 99 | 82 | 93 | 24 |
| CF3CHFCF2CF2CHFCH2F | 106.9 | 67 | 99 | 77 | 99 | 82 | 93 | 24 |
| CF3CF2CF2CH2CF2CH2F | 95.1 | 63 | 99 | 73 | 99 | 80 | 93 | 24 |
| CF3CF2CHFCHFCF2CH2F | 108.1 | 67 | 99 | 77 | 99 | 83 | 94 | 24 |
| CF3CHFCF2CHFCF2CH2F | 110.1 | 68 | 99 | 78 | 99 | 83 | 94 | 24 |
| CF3CF2CH2CF2CF2CH2F | 101.9 | 65 | 99 | 75 | 99 | 81 | 93 | 24 |
| CF3CHFCHFCF2CF2CH2F | 111.4 | 68 | 99 | 78 | 99 | 83 | 94 | 24 |
| CHF2CF2CHFCF2CF2CH2F | 101.2 | 65 | 99 | 75 | 99 | 81 | 93 | 24 |
| CF3CF2CF2CF2CHFCH3 | 75.4 | 56 | 99 | 66 | 99 | 74 | 91 | 24 |
| CF3CF2CF2CHFCF2CH3 | 81.8 | 58 | 99 | 68 | 99 | 76 | 91 | 24 |
| CF3CF2CHFCF2CF2CH3 | 86.9 | 60 | 99 | 70 | 99 | 77 | 92 | 24 |
| CF3CHFCF2CF2CF2CH3 | 86.6 | 60 | 99 | 70 | 99 | 77 | 92 | 24 |
| CHF2CF2CF2CHFCHFCHF2 | 119.8 | 70 | 99 | 80 | 99 | 85 | 94 | 24 |
| CHF2CF2CHFCF2CHFCHF2 | 122.2 | 71 | 99 | 81 | 99 | 86 | 95 | 24 |
| CHF2CHFCF2CF2CHFCHF2 | 121.2 | 71 | 99 | 81 | 99 | 85 | 94 | 24 |

TABLE 1-continued

| 245ca azeotropes at 25° C. NBP = 25.4° C. STRUCTURE | VP = 0.99 atm est. BP (° C.) | 245ca Preferred Compositions (wt. %) | | 245ca More preferred Compositions (wt. %) | | 245ca Most preferred Compositions (wt. %) | | Azeo NBP (±1) |
|---|---|---|---|---|---|---|---|---|
| | | Upper | Lower | Upper | Lower | Upper | Lower | |
| CHF2CF2CF2CH2CF2CHF2 | 113 | 69 | 99 | 79 | 99 | 84 | 94 | 24 |
| CHF2CF2CHFCHFCF2CHF2 | 122.6 | 71 | 99 | 81 | 99 | 86 | 95 | 24 |
| CHF2CH2CF2CF2CF2CHF2 | 107.7 | 67 | 99 | 77 | 99 | 83 | 94 | 24 |
| CHF2CF2CF2CF2CHFCH2F | 106.4 | 67 | 99 | 77 | 99 | 82 | 93 | 24 |
| CHF2CF2CF2CHFCF2CH2F | 111.4 | 68 | 99 | 78 | 99 | 83 | 94 | 24 |
| CHF2CF2CHFCF2CF2CH2F | 113.1 | 69 | 99 | 79 | 99 | 84 | 94 | 24 |
| CHF2CHFCF2CF2CF2CH2F | 110.3 | 68 | 99 | 78 | 99 | 83 | 94 | 24 |
| CH2FCF2CF2CF2CF2CH2F | 99.4 | 65 | 99 | 75 | 99 | 81 | 93 | 24 |
| CHFCF2CF2CF2CF2CH3 | 86.1 | 60 | 99 | 70 | 99 | 77 | 92 | 24 |
| CH3CF2CF2CF3 | 16.8 | 38 | 80 | 48 | 80 | 56 | 72 | 13 |
| CH2FCHFCF2CF3 | 38 | 49 | 95 | 59 | 95 | 68 | 86 | 19 |
| CH2FCF2CHFCF3 | 42.6 | 51 | 99 | 61 | 99 | 70 | 89 | 20 |
| CH2FCF2CH2CF3 | 44.7 | 52 | 99 | 62 | 99 | 71 | 90 | 20 |
| CF2HCH2CF2CF3 | 40.2 | 50 | 99 | 60 | 99 | 70 | 89 | 20 |
| CF2HCHFCHFCF3 | 51.9 | 55 | 99 | 65 | 99 | 74 | 91 | 21 |
| CF3CH2CHFCF3 | 41.5 | 50 | 99 | 60 | 99 | 70 | 89 | 20 |
| CH2FCF2CF2CF2H | 44.7 | 52 | 99 | 62 | 99 | 71 | 90 | 20 |
| CF2HCHFCF2CF2H | 54.7 | 56 | 99 | 66 | 99 | 75 | 91 | 21 |
| CF3CF2CHFCH2CF3 | 65.3 | 55 | 99 | 65 | 99 | 74 | 91 | |
| CF3CH2CF2CHFCF3 | 68.6 | 56 | 99 | 66 | 99 | 75 | 91 | 24 |
| CF3CHFCH2CF2CF3 | 66.5 | 56 | 99 | 66 | 99 | 74 | 91 | 24 |
| CF3CHFCHFCHFCF3 | 77 | 60 | 99 | 70 | 99 | 77 | 92 | 24 |
| CF3CF2CH2CF2CHF2 | 71.6 | 58 | 99 | 68 | 99 | 75 | 91 | 24 |
| CF3CHFCHFCF2CHF2 | 80.6 | 61 | 99 | 71 | 99 | 78 | 92 | 24 |
| CF3CF2CH2CF2CHF2 | 70.5 | 57 | 99 | 67 | 99 | 75 | 91 | 24 |
| CF3CHFCF2CHFCHF2 | 79.5 | 61 | 99 | 71 | 99 | 78 | 92 | 24 |
| CF3CF2CHFCHFCHF2 | 76.5 | 60 | 99 | 70 | 99 | 77 | 92 | 24 |
| CF3CF2CF2CH2CHF2 | 63.6 | 54 | 99 | 64 | 99 | 73 | 90 | 24 |
| CF3CF2CF2CHFCH2F | 62.3 | 54 | 99 | 64 | 99 | 73 | 90 | 24 |
| CF3CF2CHFCF2CH2F | 68.1 | 56 | 99 | 66 | 99 | 74 | 91 | 24 |
| CF3CHFCF2CF2CH2F | 70.3 | 57 | 99 | 67 | 99 | 75 | 91 | 24 |
| CF3CF2CF2CF2CH3 | 41.9 | 45 | 99 | 55 | 99 | 66 | 88 | 24 |
| CHF2CF2CF2CHFCHF2 | 80.7 | 61 | 99 | 71 | 99 | 78 | 92 | 24 |
| CHF2CF2CHFCF2CHF2 | 82.6 | 62 | 99 | 72 | 99 | 79 | 92 | 24 |
| CHF2CF2CF2CF2CH2F | 69.8 | 57 | 99 | 67 | 99 | 75 | 91 | 24 |
| CH3(CF2)4CF3 | 67.1 | 51 | 99 | 61 | 99 | 71 | 90 | 24 |
| CH2FCHF(CF2)3CF3 | 87.4 | 59 | 99 | 69 | 99 | 76 | 91 | 24 |
| CH2FCF2CHFCF2CF2CF3 | 92.3 | 61 | 99 | 71 | 99 | 78 | 92 | 24 |
| CH2FCF2CF2CHFCF2CF3 | 95.8 | 62 | 99 | 72 | 99 | 79 | 92 | 24 |
| CH2F(CF2)3CHFCF3 | 95.4 | 62 | 99 | 72 | 99 | 79 | 92 | 24 |
| CF2HCH2(CF2)3CF3 | 88.7 | 59 | 99 | 69 | 99 | 77 | 92 | 24 |
| CF2HCHFCHFCF2CF2CF3 | 100.8 | 63 | 99 | 73 | 99 | 80 | 93 | 24 |
| CF2HCHFCF2CHFCF2CF3 | 104.9 | 65 | 99 | 75 | 99 | 81 | 93 | 24 |
| CF2HCHFCF2CF2CHFCF3 | 106.3 | 65 | 99 | 75 | 99 | 81 | 93 | 24 |
| CF2HCF2CH2CF2CF2CF3 | 94 | 61 | 99 | 71 | 99 | 78 | 92 | 24 |
| CF2HCF2CHFCHFCF2CF3 | 105.3 | 65 | 99 | 75 | 99 | 81 | 93 | 24 |
| CF2HCF2CHFCF2CHFCF3 | 107.3 | 65 | 99 | 75 | 99 | 81 | 93 | 24 |
| CF2HCF2CF2CH2CF2CF3 | 97.4 | 62 | 99 | 72 | 99 | 79 | 92 | 24 |
| CF2HCF2CF2CHFCHFCF3 | 106.6 | 65 | 99 | 75 | 99 | 81 | 93 | 24 |
| CF2H(CF2)3CH2CF3 | 96.7 | 62 | 99 | 72 | 99 | 79 | 92 | 24 |
| CF3CH2CHFCF2CF2CF3 | 89.5 | 60 | 99 | 70 | 99 | 77 | 92 | 24 |
| CF3CH2CF2CHFCF2CF3 | 94.1 | 61 | 99 | 71 | 99 | 78 | 92 | 24 |
| CF3CHFCF2CF2CH2CF3 | 97.2 | 62 | 99 | 72 | 99 | 79 | 92 | 24 |
| CF3CF2CF2CH2CHFCF3 | 89.9 | 60 | 99 | 70 | 99 | 77 | 92 | 24 |
| CF3CHFCHFCHFCF2CF3 | 101.6 | 64 | 99 | 74 | 99 | 80 | 93 | 24 |
| CF3CHFCF2CHFCHFCF3 | 105.4 | 65 | 99 | 75 | 99 | 81 | 93 | 24 |
| CF3CHFCF2CH2CF2CF3 | 94.5 | 61 | 99 | 71 | 99 | 78 | 92 | 24 |
| CF3CF2CH2CHFCF2CF3 | 90.2 | 60 | 99 | 70 | 99 | 77 | 92 | 24 |
| CH2F(CF2)4CF2H | 94.9 | 62 | 99 | 72 | 99 | 78 | 92 | 24 |
| CF2HCHF(CF2)3CF2H | 105.8 | 65 | 99 | 75 | 99 | 81 | 93 | 24 |
| CF2HCF2CHFCF2CF2CF2H | 108.5 | 66 | 99 | 76 | 99 | 82 | 93 | 24 |
| CF3CHFCHFCF3 | 38.7 | 47 | 95 | 57 | 99 | 67 | 88 | 20 |
| CF3CF2CF2CH2F | 25.7 | 40 | 90 | 50 | 99 | 62 | 87 | 19 |
| CF3CF2CHFCHF2 | 37.4 | 46 | 95 | 56 | 99 | 67 | 88 | 20 |
| CF3CHFCF2CHF2 | 39.8 | 47 | 95 | 57 | 99 | 68 | 89 | 20 |
| CF3CF2CH2CHF2 | 29.1 | 42 | 90 | 52 | 99 | 64 | 87 | 19 |
| CHF2CF2CF2CHF2 | 40.1 | 47 | 95 | 57 | 99 | 68 | 89 | 20 |
| CH2FCF2CF2CH2CF3 | 50.8 | 47 | 99 | 57 | 99 | 67 | 88 | 21 |
| CF2HCHFCF2CF2CF3 | 61.7 | 52 | 99 | 62 | 99 | 71 | 90 | 22 |
| CF2HCF2CHFCF2CF3 | 65.3 | 53 | 99 | 63 | 99 | 72 | 90 | 22 |
| CF2HCF2CF2CHFCF3 | 65.8 | 53 | 99 | 63 | 99 | 72 | 90 | 22 |
| CF3CH2CF2CF2CF3 | 52.6 | 48 | 99 | 58 | 99 | 68 | 89 | 22 |
| CF3CF2CHFCHFCF3 | 63.3 | 52 | 99 | 62 | 99 | 72 | 90 | 23 |
| CF3CHFCF2CHFCF3 | 64.6 | 53 | 99 | 63 | 99 | 72 | 90 | 23 |

TABLE 1-continued

| 245ca azeotropes at 25° C. NBP = 25.4° C. STRUCTURE | VP = 0.99 atm est. BP (° C.) | 245ca Preferred Compositions (wt. %) | | 245ca More preferred Compositions (wt. %) | | 245ca Most preferred Compositions (wt. %) | | Azeo NBP (±1) |
|---|---|---|---|---|---|---|---|---|
| | | Upper | Lower | Upper | Lower | Upper | Lower | |
| CF3CF2CH2CF2CF3 | 55 | 49 | 99 | 59 | 99 | 69 | 89 | 22 |
| CF2HCF2CF2CF2CF2H | 65.3 | 53 | 99 | 63 | 99 | 72 | 90 | 23 |
| CF3CF2CHFCHFCF2CF3 | 88 | 58 | 99 | 68 | 99 | 75 | 91 | 24 |
| CF3CF2CF2CH2CF2CF3 | 78.4 | 54 | 99 | 64 | 99 | 73 | 90 | 24 |
| CF3CHFCF2CF2CHFCF3 | 91.4 | 59 | 99 | 69 | 99 | 76 | 91 | 24 |
| CF3CF2CHFCF2CHFCF3 | 90 | 58 | 99 | 68 | 99 | 76 | 91 | 24 |
| CF3CHFCHFCF2CF2CF3 | 87.6 | 57 | 99 | 67 | 99 | 75 | 91 | 24 |
| CF3CF2CF2CF2CH2CF3 | 77.7 | 54 | 99 | 64 | 99 | 73 | 90 | 24 |
| CF3CF2CF2CF2CHFCHF2 | 86.8 | 57 | 99 | 67 | 99 | 75 | 91 | 24 |
| CF3CF2CF2CHFCF2CHF2 | 89.5 | 58 | 99 | 68 | 99 | 76 | 91 | 24 |
| CF3CF2CHFCF2CF2CHF2 | 91.2 | 59 | 99 | 69 | 99 | 76 | 91 | 24 |
| CF3CHFCF2CF2CF2CHF2 | 90.9 | 59 | 99 | 69 | 99 | 76 | 91 | 24 |
| CF3CF2CF2CF2CF2CH2F | 75.9 | 53 | 99 | 63 | 99 | 72 | 90 | 24 |
| CF2HCF2CF2CF2CF2CHF2 | 90.4 | 58 | 99 | 68 | 99 | 76 | 91 | 24 |
| CF2HCF2CF2CF2CF3 | 71.4 | 50 | 99 | 60 | 99 | 70 | 89 | 24 |
| CF3CHFCF2CF2CF2CF3 | 71.9 | 50 | 99 | 60 | 99 | 70 | 89 | 24 |
| CF3CF2CHFCF2CF2CF3 | 72.2 | 50 | 99 | 60 | 99 | 70 | 89 | 24 |
| CF2HCF2CF2CF3 | 21.1 | 36 | 90 | 46 | 80 | 54 | 71 | 16 |
| CF3CHFCF2CF3 | 22.5 | 36 | 90 | 46 | 80 | 55 | 72 | 16 |
| CF2HCF2CF3 | −3.14 | 28 | 60 | 38 | 50 | 41 | 47 | −5 |
| CF3CHFCF3 | −2.99 | 29 | 60 | 39 | 50 | 41 | 47 | −5 |

TABLE 2

| 245ea azeotropes at 25° C. NBP = 40.0 STRUCTURE | VP = 0.53 atm est. BP (° C.) | 245ea Preferred Compositions (wt. %) | | 245ea More Preferred Compositions (wt. %) | | 245ea Most Preferred Compositions (wt. %) | | Azeo NBP (±1) |
|---|---|---|---|---|---|---|---|---|
| | | Upper | Lower | Upper | Lower | Upper | Lower | |
| CF3CF2CF2CH2CH3 | 46.3 | 1 | 90 | 10 | 88 | 30 | 69 | 34 |
| CF3CF2CH2CF2CH3 | 59.4 | 1 | 95 | 10 | 93 | 31 | 72 | 35 |
| CF3CF2CHFCHFCH3 | 61.7 | 1 | 95 | 10 | 93 | 31 | 72 | 35 |
| CF2CH2CF2CF2CH3 | 67.2 | 1 | 95 | 10 | 93 | 31 | 72 | 35 |
| CF3CHFCF2CHFCH3 | 68 | 1 | 95 | 10 | 93 | 31 | 72 | 35 |
| CF3CHFCHFCF2CH3 | 72.9 | 1 | 97 | 10 | 95 | 31 | 74 | 36 |
| CF3CF2CHFCH2CH2F | 70 | 1 | 97 | 10 | 95 | 31 | 74 | 36 |
| CF3CF2CH2CHFCH2F | 75.2 | 1 | 97 | 10 | 95 | 31 | 74 | 36 |
| CF3CHFCF2CH2CH2F | 76.8 | 1 | 97 | 10 | 95 | 31 | 74 | 36 |
| CF3CHFCH2CF2CH2F | 83.1 | 1 | 99 | 10 | 97 | 32 | 75 | 37 |
| CF3CH2CF2CHFCH2F | 84.2 | 1 | 99 | 10 | 97 | 32 | 75 | 37 |
| CF3CH2CHFCF2CH2F | 85.4 | 1 | 99 | 10 | 97 | 32 | 75 | 37 |
| CF3CHFCHFCHFCH2F | 89.1 | 1 | 99 | 10 | 97 | 32 | 75 | 37 |
| CF3CF2CH2CH2CHF2 | 72.5 | 1 | 97 | 10 | 95 | 31 | 74 | 36 |
| CF3CH2CH2CF2CHF2 | 80.4 | 1 | 99 | 10 | 97 | 32 | 75 | 37 |
| CF3CH2CF2CH2CHF2 | 82 | 1 | 99 | 10 | 97 | 32 | 75 | 37 |
| CF3CHFCHFCH2CHF2 | 86.5 | 1 | 99 | 10 | 97 | 32 | 75 | 37 |
| CF3CHFCH2CHFCHF2 | 87.7 | 1 | 99 | 10 | 97 | 32 | 75 | 37 |
| CF3CH2CHFCHFCHF2 | 90.4 | 1 | 99 | 10 | 97 | 32 | 75 | 38 |
| CF3CH2CH2CHFCF3 | 72.9 | 1 | 97 | 10 | 95 | 31 | 74 | 37 |
| CF3CH2CHFCH2CF3 | 75.7 | 1 | 97 | 10 | 95 | 31 | 74 | 37 |
| CH2FCF2CF2CF2CH3 | 65.4 | 1 | 95 | 10 | 93 | 31 | 72 | 37 |
| CH2FCH2CF2CF2CHF2 | 79.7 | 1 | 99 | 10 | 97 | 32 | 75 | 37 |
| CH2FCF2CF2CH2CHF2 | 87.1 | 1 | 99 | 10 | 97 | 32 | 75 | 38 |
| CH2FCF2CH2CF2CHF2 | 87.2 | 1 | 99 | 10 | 97 | 32 | 75 | 38 |
| CH2FCHFCHFCF2CHF2 | 92.8 | 1 | 99 | 10 | 97 | 32 | 75 | 38 |
| CH2FCHFCF2CHFCHF2 | 95 | 1 | 99 | 10 | 97 | 32 | 75 | 38 |
| CH2FCF2CHFCHFCHF2 | 96.6 | 1 | 99 | 10 | 97 | 32 | 75 | 38 |
| CHF2CF2CF2CHFCH3 | 69.2 | 1 | 95 | 10 | 93 | 31 | 72 | 36 |
| CHF2CF2CHFCF2CH3 | 74.8 | 1 | 97 | 10 | 95 | 31 | 74 | 36 |
| CHF2CHFCF2CF2CH3 | 76.3 | 1 | 97 | 10 | 95 | 31 | 74 | 36 |
| CHF2CF2CHFCH2CHF2 | 91.9 | 1 | 99 | 10 | 97 | 32 | 75 | 38 |
| CHF2CHFCF2CH2CHF2 | 94.6 | 1 | 99 | 10 | 97 | 32 | 75 | 38 |
| CHF2CF2CH2CHFCHF2 | 93.6 | 1 | 99 | 10 | 97 | 32 | 75 | 38 |
| CHF2CHFCHFCHFCHF2 | 103.4 | 1 | 99 | 10 | 97 | 32 | 75 | 38 |
| CH2FCHFCF2CF2CH2F | 85.8 | 1 | 99 | 10 | 97 | 32 | 75 | 38 |
| CH2FCF2CHFCF2CH2F | 88.1 | 1 | 99 | 10 | 97 | 32 | 75 | 38 |
| CF3CH2CH2CF3 | 40.7 | 1 | 80 | 10 | 78 | 27 | 61 | 34 |
| CF3CHFCH2CHF2 | 50.8 | 1 | 90 | 10 | 88 | 30 | 69 | 35 |
| CF3CH2CHFCHF2 | 53 | 1 | 90 | 10 | 88 | 30 | 69 | 35 |
| CF3CF2CH2CH2F | 37.3 | 1 | 70 | 10 | 68 | 25 | 54 | 32 |
| CF3CHFCHFCH2F | 50.8 | 1 | 90 | 10 | 88 | 30 | 69 | 35 |

TABLE 2-continued

| 245ea azeotropes at 25° C. NBP = 40.0 STRUCTURE | VP = 0.53 atm est. BP (° C.) | 245ea Preferred Compositions (wt. %) | | 245ea More Preferred Compositions (wt. %) | | 245ea Most Preferred Compositions (wt. %) | | Azeo NBP (±1) |
|---|---|---|---|---|---|---|---|---|
| | | Upper | Lower | Upper | Lower | Upper | Lower | |
| CF3CH2CF2CH2F | 45.8 | 1 | 90 | 10 | 88 | 30 | 69 | 35 |
| CHF2CH2CF2CHF2 | 55.7 | 1 | 90 | 10 | 88 | 30 | 69 | 36 |
| CHF2CHFCHFCHF2 | 65.1 | 1 | 85 | 10 | 83 | 28 | 65 | 37 |
| CHF2CF2CHFCH2F | 55.3 | 1 | 90 | 10 | 88 | 30 | 69 | 36 |
| CHF2CHFCF2CH2F | 57.5 | 1 | 90 | 10 | 88 | 30 | 69 | 36 |
| CH2FCF2CF2CH2F | 49.2 | 1 | 90 | 10 | 88 | 30 | 69 | 35 |
| CHF2CF2CF2CH3 | 35.8 | 1 | 70 | 10 | 68 | 25 | 54 | 30 |
| CF3CF2CHFCH3 | 26 | 1 | 70 | 10 | 68 | 25 | 54 | 23 |
| CF3CHFCF2CH3 | 32 | 1 | 70 | 10 | 68 | 25 | 54 | 29 |
| CF3CHFCHFCF2CHFCH2F | 120.9 | 1 | 99 | 10 | 97 | 32 | 75 | 39 |
| CF3CH2CF2CF2CHFCH2F | 112.7 | 1 | 99 | 10 | 97 | 32 | 75 | 39 |
| CF3CF2CHFCH2CF2CH2F | 106.9 | 1 | 99 | 10 | 97 | 32 | 75 | 39 |
| CF3CHFCF2CH2CF2CH2F | 111.2 | 1 | 99 | 10 | 97 | 32 | 75 | 39 |
| CF3CF2CH2CHFCF2CH2F | 110.3 | 1 | 99 | 10 | 97 | 32 | 75 | 39 |
| CF3CHFCHFCHFCF2CH2F | 121.8 | 1 | 99 | 10 | 97 | 32 | 75 | 39 |
| CF3CH2CF2CFHCF2CH2F | 114.2 | 1 | 99 | 10 | 97 | 32 | 75 | 39 |
| CF3CHFCH2CF2CF2CH2F | 113.4 | 1 | 99 | 10 | 97 | 32 | 75 | 39 |
| CF3CH2CHFCF2CF2CH2F | 113.1 | 1 | 99 | 10 | 97 | 32 | 75 | 39 |
| CF3CHFCH2CF2CHFCHF2 | 120.9 | 1 | 99 | 10 | 97 | 32 | 75 | 39 |
| CF3CH2CHFCF2CHFCHF2 | 122.2 | 1 | 99 | 10 | 97 | 32 | 75 | 39 |
| CF2CF2CH2CH2CF2CHF2 | 104.6 | 1 | 99 | 10 | 97 | 32 | 75 | 39 |
| CF3CHFCHFCH2CF2CHF2 | 117.8 | 1 | 99 | 10 | 97 | 32 | 75 | 39 |
| CF3CH2CF2CH2CF2CHF2 | 112.4 | 1 | 99 | 10 | 97 | 32 | 75 | 39 |
| CF3CHFCH2CHFCF2CHF2 | 117.3 | 1 | 99 | 10 | 97 | 32 | 75 | 39 |
| CF3CH2CH2CF2CF2CHF2 | 107.3 | 1 | 99 | 10 | 97 | 32 | 75 | 39 |
| CF3CH2CHFCHFCF2CHF2 | 119.2 | 1 | 99 | 10 | 97 | 32 | 75 | 39 |
| CF3CF2CF2CF2CH2CH3 | 71.4 | 1 | 90 | 10 | 88 | 30 | 69 | 37 |
| CF3CF2CF2CHFCHFCH3 | 86 | 1 | 90 | 10 | 88 | 30 | 69 | 38 |
| CF3CF2CHFCF2CHFCH3 | 93.5 | 1 | 99 | 10 | 97 | 32 | 75 | 38 |
| CF3CHFCF2CF2CHFCH3 | 94.9 | 1 | 99 | 10 | 97 | 32 | 75 | 38 |
| CF3CF2CF2CH2CF2CH3 | 82.8 | 1 | 99 | 10 | 97 | 32 | 75 | 38 |
| CF3CF2CHFCHFCF2CH3 | 97.5 | 1 | 99 | 10 | 97 | 32 | 75 | 38 |
| CF3CHFCF2CHFCF2CH3 | 99.6 | 1 | 99 | 10 | 97 | 32 | 75 | 38 |
| CF3CF2CH2CF2CF2CH3 | 93 | 1 | 99 | 10 | 97 | 32 | 75 | 38 |
| CF3CHFCHFCF2CF2CH3 | 102.3 | 1 | 99 | 10 | 97 | 32 | 75 | 39 |
| CF3CH2CF2CF2CF2CH3 | 92.4 | 1 | 99 | 10 | 97 | 32 | 75 | 39 |
| CHF2CF2CF2CHFCH2CHF2 | 117.8 | 1 | 99 | 10 | 97 | 32 | 75 | 39 |
| CHF2CF2CHFCF2CH2CHF2 | 122.4 | 1 | 99 | 10 | 97 | 32 | 75 | 39 |
| CHF2CHFCF2CF2CH2CHF2 | 123.1 | 1 | 99 | 10 | 97 | 32 | 75 | 39 |
| CF3CF2CHFCH2CHFCHF2 | 120.4 | 1 | 99 | 10 | 97 | 32 | 75 | 39 |
| CHF2CF2CHFCHFCHFCHF2 | 132.1 | 1 | 99 | 10 | 97 | 32 | 75 | 39 |
| CHF2CHFCF2CHFCHFCHF2 | 133.5 | 1 | 99 | 10 | 97 | 32 | 75 | 39 |
| CGF2CF2CH2CF2CHFCHF2 | 124.9 | 1 | 99 | 10 | 97 | 32 | 75 | 39 |
| CHF2CF2CHFCH2CF2CHF2 | 123.1 | 1 | 99 | 10 | 97 | 32 | 75 | 39 |
| CHF2CF2CF2CF2CH2CH2F | 104.8 | 1 | 99 | 10 | 97 | 32 | 75 | 39 |
| CHF2CF2CF2CHFCHFCH2F | 118.7 | 1 | 99 | 10 | 97 | 32 | 75 | 39 |
| CHF2CF2CHFCF2CHFCH2F | 122.9 | 1 | 99 | 10 | 97 | 32 | 75 | 39 |
| CHF2CHFCF2CF2CHFCH2F | 121.8 | 1 | 99 | 10 | 97 | 32 | 75 | 39 |
| CHF2CF2CF2CH2CF2CH2F | 114.1 | 1 | 99 | 10 | 97 | 32 | 75 | 39 |
| CHF2CF2CHFCHFCF2CH2F | 125.4 | 1 | 99 | 10 | 97 | 32 | 75 | 39 |
| CHF2CHFCF2CHFCF2CH2F | 125 | 1 | 99 | 10 | 97 | 32 | 75 | 39 |
| CHF2CF2CH2CF2CF2CH2F | 117.5 | 1 | 99 | 10 | 97 | 32 | 75 | 39 |
| CHF2CHFCHFCF2CF2CH2F | 124.2 | 1 | 99 | 10 | 97 | 32 | 75 | 39 |
| CHF2CH2CF2CF2CF2CH2F | 112.2 | 1 | 99 | 10 | 97 | 32 | 75 | 39 |
| CF2HCF2CF2CF2CHFCH3 | 94.4 | 1 | 99 | 10 | 97 | 32 | 75 | 39 |
| CF2HCF2CF2CHFCF2CH3 | 100.8 | 1 | 99 | 10 | 97 | 32 | 75 | 39 |
| CHF2CF2CHFCF2CF2CH3 | 104.2 | 1 | 99 | 10 | 97 | 32 | 75 | 39 |
| CHF2CHFCF2CF2CF2CH3 | 101.4 | 1 | 99 | 10 | 97 | 32 | 75 | 39 |
| CH2FCF2CF2CF2CF2CH3 | 90.6 | 1 | 99 | 10 | 97 | 32 | 75 | 39 |
| CH2FCF2CF2CF2CHFCH2F | 110.9 | 1 | 99 | 10 | 97 | 32 | 75 | 39 |
| CH2FCF2CF2CHFCF2CH2F | 115.9 | 1 | 99 | 10 | 97 | 32 | 75 | 39 |
| CF3CH2CH2CHFCF2CF3 | 96.7 | 1 | 99 | 10 | 97 | 32 | 75 | 39 |
| CF3CH2CH2CF2CHFCF3 | 104.4 | 1 | 99 | 10 | 97 | 32 | 75 | 39 |
| CF3CF2CH2CHFCH2CF3 | 100.7 | 1 | 99 | 10 | 97 | 32 | 75 | 39 |
| CF3CHFCHFCHFCH2CF3 | 115.5 | 1 | 99 | 10 | 97 | 32 | 75 | 39 |
| CF3CH2CF2CHFCH2CF3 | 111.4 | 1 | 99 | 10 | 97 | 32 | 75 | 39 |
| CF3CHFCH2CF2CH2CF3 | 108.4 | 1 | 99 | 10 | 97 | 32 | 75 | 39 |
| CF3CHFCH2CH2CF2CF3 | 97.1 | 1 | 99 | 10 | 97 | 32 | 75 | 39 |
| CF3CHFCHFCH2CHFCF3 | 112 | 1 | 99 | 10 | 97 | 32 | 75 | 39 |
| CF3CF2CF2CH2CH2CHF2 | 95.9 | 1 | 99 | 10 | 97 | 32 | 75 | 39 |
| CF3CF2CHFCHFCH2CHF2 | 111.2 | 1 | 99 | 10 | 97 | 32 | 75 | 39 |
| CF3CHFCF2CHFCH2CHF2 | 116.6 | 1 | 99 | 10 | 97 | 32 | 75 | 39 |
| CF3CF2CH2CF2CH2CHF2 | 107.9 | 1 | 99 | 10 | 97 | 32 | 75 | 39 |
| CF3CHFCHFCF2CH2CHF2 | 120.5 | 1 | 99 | 10 | 97 | 32 | 75 | 39 |

TABLE 2-continued

| 245ea azeotropes at 25° C. NBP = 40.0 STRUCTURE | VP = 0.53 atm est. BP (° C.) | 245ea Preferred Compositions (wt. %) | | 245ea More Preferred Compositions (wt. %) | | 245ea Most Preferred Compositions (wt. %) | | Azeo NBP (±1) |
|---|---|---|---|---|---|---|---|---|
| | | Upper | Lower | Upper | Lower | Upper | Lower | |
| CF3CH2CF2CF2CH2CHF2 | 114 | 1 | 99 | 10 | 97 | 32 | 75 | 39 |
| CF3CF2CHFCH2CHFCHF2 | 111.5 | 1 | 99 | 10 | 97 | 32 | 75 | 39 |
| CF3CHFCF2CH2CHFCHF2 | 117.4 | 1 | 99 | 10 | 97 | 32 | 75 | 39 |
| CF3CF2CH2CHFCHFCHF2 | 115.4 | 1 | 99 | 10 | 97 | 32 | 75 | 39 |
| CF3CHFCHFCHFCHFCHF2 | 128.5 | 1 | 99 | 10 | 97 | 32 | 75 | 39 |
| CF3CH2CF2CHFCHFCHF2 | 122.7 | 1 | 99 | 10 | 97 | 32 | 75 | 39 |
| CF3CF2CF2CHFCH2CH2F | 94.3 | 1 | 99 | 10 | 97 | 32 | 75 | 39 |
| CF3CF2CHFCF2CH2CH2F | 102.3 | 1 | 99 | 10 | 97 | 32 | 75 | 39 |
| CF3CHFCF2CF2CH2CH2F | 105.3 | 1 | 99 | 10 | 97 | 32 | 75 | 39 |
| CF3CF2CF2CH2CHFCH2F | 98.6 | 1 | 99 | 10 | 97 | 32 | 75 | 39 |
| CF3CF2CHFCHFCHFCH2F | 113.8 | 1 | 99 | 10 | 97 | 32 | 75 | 39 |
| CF3CHFCF2CHFCHFCH2F | 117.5 | 1 | 99 | 10 | 97 | 32 | 75 | 39 |
| CF3CF2CH2CF2CHFCH2F | 110 | 1 | 99 | 10 | 97 | 32 | 75 | 39 |
| CH3CHFCF2CF2CF3 | 50.2 | 1 | 90 | 10 | 88 | 30 | 69 | 35 |
| CH3CF2CFHCF2CF3 | 57.5 | 1 | 90 | 10 | 88 | 30 | 69 | 35 |
| CH3CF2CF2CHFCF3 | 60.9 | 1 | 95 | 10 | 93 | 31 | 72 | 36 |
| CH2FCH2CF2CF2CF3 | 60.7 | 1 | 95 | 10 | 93 | 31 | 72 | 36 |
| CH2FCHFCHFCF2CF3 | 75.5 | 1 | 95 | 10 | 93 | 31 | 72 | 37 |
| CH2FCHFCF2CHFCF3 | 80.1 | 1 | 97 | 10 | 95 | 31 | 74 | 38 |
| CH2FCF2CH2CF2CF3 | 71.6 | 1 | 95 | 10 | 93 | 31 | 72 | 37 |
| CH2FCF2CHFCHFCF3 | 83.5 | 1 | 99 | 10 | 97 | 32 | 75 | 38 |
| CH2FCF2CF2CH2CF3 | 76.1 | 1 | 95 | 10 | 93 | 31 | 72 | 37 |
| CF2HCH2CHFCF2CF3 | 74.6 | 1 | 95 | 10 | 93 | 31 | 72 | 38 |
| CF2HCH2CF2CHFCF3 | 79.7 | 1 | 95 | 10 | 93 | 31 | 72 | 38 |
| CF2HCHFCH2CF2CF3 | 77.9 | 1 | 95 | 10 | 93 | 31 | 72 | 38 |
| CF2HCHFCHFCHFCF3 | 90.2 | 1 | 99 | 10 | 97 | 32 | 75 | 38 |
| CF2HCHFCF2CH2CF3 | 83.5 | 1 | 99 | 10 | 97 | 32 | 75 | 38 |
| CF2HCF2CH2CFHCF3 | 82 | 1 | 99 | 10 | 97 | 32 | 75 | 38 |
| CF2HCF2CHFCH2CF3 | 82.6 | 1 | 99 | 10 | 97 | 32 | 75 | 38 |
| CF3CH2CH2CF2CF3 | 64.8 | 1 | 95 | 10 | 93 | 31 | 72 | 37 |
| CF3CH2CHFCHFCF3 | 77.2 | 1 | 95 | 10 | 93 | 31 | 72 | 38 |
| CF3CH2CF2CH2CF3 | 71 | 1 | 95 | 10 | 93 | 31 | 72 | 37 |
| CF3CHFCH2CHFCF3 | 76.2 | 1 | 95 | 10 | 93 | 31 | 72 | 38 |
| CH2FCF2CHFCF2CF2H | 85.4 | 1 | 99 | 10 | 97 | 32 | 75 | 38 |
| CH2FCF2CF2CHFCF2H | 85.2 | 1 | 99 | 10 | 97 | 32 | 75 | 38 |
| CH2FCHFCF2CF2CF2H | 81.3 | 1 | 99 | 10 | 97 | 32 | 75 | 38 |
| CH3CF2CF2CF2CF2H | 60.9 | 1 | 95 | 10 | 93 | 31 | 72 | 36 |
| CF2HCH2CF2CF2CF2H | 82.6 | 1 | 99 | 10 | 97 | 32 | 75 | 38 |
| CF2HCHFCHFCF2CF2H | 93.8 | 1 | 99 | 10 | 97 | 32 | 75 | 39 |
| CF2HCHFCF2CHFCF2H | 94.3 | 1 | 99 | 10 | 97 | 32 | 75 | 39 |
| CF2HCF2CH2CF2CF2H | 86.1 | 1 | 99 | 10 | 97 | 32 | 75 | 38 |
| CH2FCF2CF2CF2CH2F | 74.3 | 1 | 95 | 10 | 93 | 31 | 72 | 37 |
| CF3CF2CF2CH2CH2CF3 | 88.3 | 1 | 99 | 10 | 97 | 32 | 75 | 38 |
| CF3CF2CHFCHFCH2CF3 | 101.9 | 1 | 99 | 10 | 97 | 32 | 75 | 39 |
| CF3CHFCF2CHFCH2CF3 | 107.3 | 1 | 99 | 10 | 97 | 32 | 75 | 39 |
| CF3CF2CH2CF2CH2CF3 | 96.9 | 1 | 99 | 10 | 97 | 32 | 75 | 39 |
| CF3CHFCHFCF2CH2CF3 | 109.5 | 1 | 99 | 10 | 97 | 32 | 75 | 39 |
| CF3CH2CF2CF2CH2CF3 | 103 | 1 | 99 | 10 | 97 | 32 | 75 | 39 |
| CF3CHFCH2CHFCF2CF3 | 100 | 1 | 99 | 10 | 97 | 32 | 75 | 39 |
| CF3CHFCH2CF2CHFCF3 | 10.6 | 1 | 99 | 10 | 97 | 32 | 75 | 39 |
| CF3CHFCHFCH2CF2CF3 | 102.2 | 1 | 99 | 10 | 97 | 32 | 75 | 39 |
| CF3CHFCHFCHFCHFCF3 | 115.3 | 1 | 99 | 10 | 97 | 32 | 75 | 39 |
| CF3CH2CH2CH2CF2CF3 | 89 | 1 | 99 | 10 | 97 | 32 | 75 | 38 |
| CF3CF2CF2CHFCH2CHF2 | 98.8 | 1 | 99 | 10 | 97 | 32 | 75 | 39 |
| CF3CF2CHFCF2CH2CHF2 | 105.1 | 1 | 99 | 10 | 97 | 32 | 75 | 39 |
| CF3CHFCF2CF2CHFCHF2 | 108.2 | 1 | 99 | 10 | 97 | 32 | 75 | 39 |
| CF3CF2CF2CH2CHFCHF2 | 101.4 | 1 | 99 | 10 | 97 | 32 | 75 | 39 |
| CF3CF2CHFCHFCHFCHF2 | 114.8 | 1 | 99 | 10 | 97 | 32 | 75 | 39 |
| CF3CHFCF2CHFCHFCHF2 | 118.6 | 1 | 99 | 10 | 97 | 32 | 75 | 39 |
| CF3CF2CH2CF2CHFCHF2 | 109.4 | 1 | 99 | 10 | 97 | 32 | 75 | 39 |
| CF3CHFCHFCF2CHFCHF2 | 120.3 | 1 | 99 | 10 | 97 | 32 | 75 | 39 |
| CF3CH2CF2CF2CHFCHF2 | 112.1 | 1 | 99 | 10 | 97 | 32 | 75 | 39 |
| CF3CF2CHFCH2CF2CHF2 | 105.8 | 1 | 99 | 10 | 97 | 32 | 75 | 39 |
| CF3CHFCF2CH2CF2CHF2 | 110.1 | 1 | 99 | 10 | 97 | 32 | 75 | 39 |
| CF3CF2CH2CHFCF2CHF2 | 107.5 | 1 | 99 | 10 | 97 | 32 | 75 | 39 |
| CF3CHFCHFCHFCF2CHF2 | 118.9 | 1 | 99 | 10 | 97 | 32 | 75 | 39 |
| CF3CH2CF2CHFCF2CHF2 | 111.4 | 1 | 99 | 10 | 97 | 32 | 75 | 39 |
| CF3CHFCH2CF2CF2CHF2 | 108.9 | 1 | 99 | 10 | 97 | 32 | 75 | 39 |
| CF3CH2CHFCF2CF2CHF2 | 108.5 | 1 | 99 | 10 | 97 | 32 | 75 | 39 |
| CF3CF2CF2CF2CH2CH2F | 85.8 | 1 | 99 | 10 | 97 | 32 | 75 | 38 |
| CF3CF2CF2CHFCHFCH2F | 99.7 | 1 | 99 | 10 | 97 | 32 | 75 | 39 |
| CF3CF2CHFCF2CHFCH2F | 105.6 | 1 | 99 | 10 | 97 | 32 | 75 | 39 |
| CF3CHFCF2CF2CHFCH2F | 106.9 | 1 | 99 | 10 | 97 | 32 | 75 | 39 |
| CF3CF2CF2CH2CF2CH2F | 95.1 | 1 | 99 | 10 | 97 | 32 | 75 | 39 |

TABLE 2-continued

| 245ea azeotropes at 25° C. NBP = 40.0 | VP = 0.53 atm | 245ea Preferred Compositions (wt. %) | | 245ea More Preferred Compositions (wt. %) | | 245ea Most Preferred Compositions (wt. %) | | Azeo NBP |
|---|---|---|---|---|---|---|---|---|
| STRUCTURE | est. BP (° C.) | Upper | Lower | Upper | Lower | Upper | Lower | (±1) |
| CF3CF2CHFCHFCF2CH2F | 108.1 | 1 | 99 | 10 | 97 | 32 | 75 | 39 |
| CF3CHFCF2CHFCF2CH2F | 110.1 | 1 | 99 | 10 | 97 | 32 | 75 | 39 |
| CF3CF2CH2CF2CF2CH2F | 101.9 | 1 | 99 | 10 | 97 | 32 | 75 | 39 |
| CF3CHFCHFCF2CF2CH2F | 111.4 | 1 | 99 | 10 | 97 | 32 | 75 | 39 |
| CHF2CF2CHFCF2CF2CH2F | 101.2 | 1 | 99 | 10 | 97 | 32 | 75 | 39 |
| CF3CF2CF2CF2CHFCH3 | 75.4 | 1 | 99 | 10 | 97 | 32 | 75 | 37 |
| CF3CF2CF2CHFCF2CH3 | 81.8 | 1 | 99 | 10 | 97 | 32 | 75 | 38 |
| CF3CF2CHFCF2CF2CH3 | 86.9 | 1 | 99 | 10 | 97 | 32 | 75 | 38 |
| CF3CHFCF2CF2CF2CH3 | 86.6 | 1 | 99 | 10 | 97 | 32 | 75 | 38 |
| CHF2CF2CF2CHFCHFCHF2 | 119.8 | 1 | 99 | 10 | 97 | 32 | 75 | 39 |
| CHF2CF2CHFCF2CHFCHF2 | 122.2 | 1 | 99 | 10 | 97 | 32 | 75 | 39 |
| CHF2CHFCF2CF2CHFCHF2 | 121.2 | 1 | 99 | 10 | 97 | 32 | 75 | 39 |
| CHF2CF2CF2CH2CF2CHF2 | 113 | 1 | 99 | 10 | 97 | 32 | 75 | 39 |
| CHF2CF2CHFCHFCF2CHF2 | 122.6 | 1 | 99 | 10 | 97 | 32 | 75 | 39 |
| CHF2CH2CF2CF2CF2CHF2 | 107.7 | 1 | 99 | 10 | 97 | 32 | 75 | 39 |
| CHF2CF2CF2CF2CHFCH2F | 106.4 | 1 | 99 | 10 | 97 | 32 | 75 | 39 |
| CHF2CF2CF2CHFCF2CH2F | 111.4 | 1 | 99 | 10 | 97 | 32 | 75 | 39 |
| CHF2CF2CHFCF2CF2CH2F | 113.1 | 1 | 99 | 10 | 97 | 32 | 75 | 39 |
| CHF2CHFCF2CF2CF2CH2F | 110.3 | 1 | 99 | 10 | 97 | 32 | 75 | 39 |
| CH2FCF2CF2CF2CF2CH2F | 99.4 | 1 | 99 | 10 | 97 | 32 | 75 | 39 |
| CHFCF2CF2CF2CF2CH3 | 86.1 | 1 | 99 | 10 | 97 | 32 | 75 | 38 |
| CH3CF2CF2CF3 | 16.8 | 1 | 50 | 10 | 48 | 20 | 39 | 15 |
| CH2FCHFCF2CF3 | 38 | 1 | 70 | 10 | 68 | 25 | 54 | 34 |
| CH2FCF2CHFCF3 | 42.6 | 1 | 75 | 10 | 73 | 26 | 57 | 34 |
| CH2FCF2CH2CF3 | 44.7 | 1 | 75 | 10 | 73 | 26 | 57 | 34 |
| CF2HCH2CF2CF3 | 40.2 | 1 | 75 | 10 | 73 | 26 | 57 | 34 |
| CF2HCHFCHFCF3 | 51.9 | 1 | 75 | 10 | 73 | 26 | 57 | 35 |
| CF3CH2CHFCF3 | 41.5 | 1 | 75 | 10 | 73 | 26 | 57 | 34 |
| CH2FCF2CF2CF2H | 44.7 | 1 | 75 | 10 | 73 | 26 | 57 | 34 |
| CF2HCHFCF2CF2H | 54.7 | 1 | 75 | 10 | 73 | 26 | 57 | 35 |
| CF3CF2CHFCH2CF3 | 65.3 | 1 | 95 | 10 | 93 | 31 | 72 | 36 |
| CF3CH2CF2CHFCF3 | 68.6 | 1 | 95 | 10 | 93 | 31 | 72 | 36 |
| CF3CHFCH2CF2CF3 | 66.5 | 1 | 95 | 10 | 93 | 31 | 72 | 36 |
| CF3CHFCHFCHFCF3 | 77 | 1 | 95 | 10 | 93 | 31 | 72 | 37 |
| CF3CH2CF2CF2CHF2 | 71.6 | 1 | 95 | 10 | 93 | 31 | 72 | 37 |
| CF3CHFCHFCF2CHF2 | 80.6 | 1 | 99 | 10 | 97 | 32 | 75 | 38 |
| CF3CF2CH2CF2CHF2 | 70.5 | 1 | 95 | 10 | 93 | 31 | 72 | 37 |
| CF3CHFCF2CHFCHF2 | 79.5 | 1 | 95 | 10 | 93 | 31 | 72 | 38 |
| CF3CF2CHFCHFCHF2 | 76.5 | 1 | 95 | 10 | 93 | 31 | 72 | 38 |
| CF3CF2CF2CH2CHF2 | 63.6 | 1 | 90 | 10 | 88 | 30 | 69 | 37 |
| CF3CF2CF2CHFCH2F | 62.3 | 1 | 90 | 10 | 88 | 30 | 69 | 37 |
| CF3CF2CHFCF2CH2F | 68.1 | 1 | 90 | 10 | 88 | 30 | 69 | 37 |
| CF3CHFCF2CF2CH2F | 70.3 | 1 | 90 | 10 | 88 | 30 | 69 | 37 |
| CF3CF2CF2CF2CH3 | 41.9 | 1 | 80 | 10 | 78 | 27 | 61 | 34 |
| CHF2CF2CF2CHFCHF2 | 80.7 | 1 | 99 | 10 | 97 | 32 | 75 | 38 |
| CHF2CF2CHFCF2CHF2 | 82.6 | 1 | 99 | 10 | 97 | 32 | 75 | 38 |
| CHF2CF2CF2CF2CH2F | 69.8 | 1 | 95 | 10 | 93 | 31 | 72 | 37 |
| CH3(CF2)4CF3 | 67.1 | 1 | 95 | 10 | 93 | 31 | 72 | 37 |
| CH2FCHF(CF2)3CF3 | 87.4 | 1 | 99 | 10 | 97 | 32 | 75 | 38 |
| CH2FCF2CHFCF2CF2CF3 | 92.3 | 1 | 99 | 10 | 97 | 32 | 75 | 39 |
| CH2FCF2CF2CHFCF2CF3 | 95.8 | 1 | 99 | 10 | 97 | 32 | 75 | 39 |
| CH2F(CF2)3CHFCF3 | 95.4 | 1 | 99 | 10 | 97 | 32 | 75 | 39 |
| CF2HCH2(CF2)3CF3 | 88.7 | 1 | 99 | 10 | 97 | 32 | 75 | 38 |
| CF2HCHFCHFCF2CF2CF3 | 100.8 | 1 | 99 | 10 | 97 | 32 | 75 | 39 |
| CF2HCHFCF2CHFCF2CF3 | 104.9 | 1 | 99 | 10 | 97 | 32 | 75 | 39 |
| CF2HCHFCF2CF2CHFCF3 | 106.3 | 1 | 99 | 10 | 97 | 32 | 75 | 39 |
| CF2HCF2CH2CF2CF2CF3 | 94 | 1 | 99 | 10 | 97 | 32 | 75 | 39 |
| CF2HCF2CHFCHFCF2CF3 | 105.3 | 1 | 99 | 10 | 97 | 32 | 75 | 39 |
| CF2HCF2CHFCF2CHFCF3 | 107.3 | 1 | 99 | 10 | 97 | 32 | 75 | 39 |
| CF2HCF2CF2CH2CF2CF3 | 97.4 | 1 | 99 | 10 | 97 | 32 | 75 | 39 |
| CF2HCF2CF2CHFCHFCF3 | 106.6 | 1 | 99 | 10 | 97 | 32 | 75 | 39 |
| CF2H(CF2)3CH2CF3 | 96.7 | 1 | 99 | 10 | 97 | 32 | 75 | 39 |
| CF3CH2CHFCF2CF2CF3 | 89.5 | 1 | 99 | 10 | 97 | 32 | 75 | 39 |
| CF3CH2CF2CHFCF2CF3 | 94.1 | 1 | 99 | 10 | 97 | 32 | 75 | 39 |
| CF3CHFCF2CF2CH2CF3 | 97.2 | 1 | 99 | 10 | 97 | 32 | 75 | 39 |
| CF3CF2CF2CH2CHFCF3 | 89.9 | 1 | 99 | 10 | 97 | 32 | 75 | 39 |
| CF3CHFCHFCHFCF2CF3 | 101.6 | 1 | 99 | 10 | 97 | 32 | 75 | 39 |
| CF3HFCF2CHFCHFCF3 | 105.4 | 1 | 99 | 10 | 97 | 32 | 75 | 39 |
| CF3CHFCF2CH2CF2CF3 | 94.5 | 1 | 99 | 10 | 97 | 32 | 75 | 39 |
| CF3CF2CH2CHFCF2CF3 | 90.2 | 1 | 99 | 10 | 97 | 32 | 75 | 39 |
| CH2F(CF2)4CF2H | 94.9 | 1 | 99 | 10 | 97 | 32 | 75 | 39 |
| CF2HCHF(CF2)3CF2H | 105.8 | 1 | 99 | 10 | 97 | 32 | 75 | 39 |
| CF2HCF2CHFCF2CF2CF2H | 108.5 | 1 | 99 | 10 | 97 | 32 | 75 | 39 |
| CF3CHFCHFCF3 | 38.7 | 1 | 70 | 10 | 68 | 25 | 54 | 33 |

TABLE 2-continued

| 245ea azeotropes at 25° C. NBP = 40.0 | VP = 0.53 atm | 245ea Preferred Compositions (wt. %) | | 245ea More Preferred Compositions (wt. %) | | 245ea Most Preferred Compositions (wt. %) | | Azeo NBP |
| --- | --- | --- | --- | --- | --- | --- | --- | --- |
| STRUCTURE | est. BP (° C.) | Upper | Lower | Upper | Lower | Upper | Lower | (±1) |
| CF3CF2CF2CH2F | 25.7 | 1 | 60 | 10 | 58 | 22 | 46 | 22 |
| CF3CF2CHFCHF2 | 37.4 | 1 | 70 | 10 | 68 | 25 | 54 | 32 |
| CF3CHFCF2CHF2 | 39.8 | 1 | 70 | 10 | 68 | 25 | 54 | 34 |
| CF3CF2CH2CHF2 | 29.1 | 1 | 70 | 10 | 68 | 25 | 54 | 26 |
| CHF2CF2CF2CHF2 | 40.1 | 1 | 70 | 10 | 68 | 25 | 54 | 34 |
| CH2FCF2CF2CH2CF3 | 50.8 | 1 | 90 | 10 | 88 | 30 | 69 | 35 |
| CF2HCHFCF2CF2CF3 | 61.7 | 1 | 95 | 10 | 93 | 31 | 72 | 36 |
| CF2HCF2CHFCF2CF3 | 65.3 | 1 | 95 | 10 | 93 | 31 | 72 | 36 |
| CF2HCF2CF2CHFCF3 | 65.8 | 1 | 95 | 10 | 93 | 31 | 72 | 36 |
| CF3CH2CF2CF2CF3 | 52.6 | 1 | 95 | 10 | 93 | 31 | 72 | 35 |
| CF3CF2CHFCHFCF3 | 63.3 | 1 | 95 | 10 | 93 | 31 | 72 | 36 |
| CF3CHFCF2CHFCF3 | 64.6 | 1 | 95 | 10 | 93 | 31 | 72 | 36 |
| CF3CF2CH2CF2CF3 | 55 | 1 | 95 | 10 | 93 | 31 | 72 | 35 |
| CF2HCF2CF2CF2CF2H | 65.3 | 1 | 95 | 10 | 93 | 31 | 72 | 36 |
| CF3CF2CHFCHFCF2CF3 | 88 | 1 | 99 | 10 | 97 | 32 | 75 | 39 |
| CF3CF2CF2CH2CF2CF3 | 78.4 | 1 | 99 | 10 | 97 | 32 | 75 | 39 |
| CF3CHFCF2CF2CHFCF3 | 91.4 | 1 | 99 | 10 | 97 | 32 | 75 | 39 |
| CF3CF2CHFCF2CHFCF3 | 90 | 1 | 99 | 10 | 97 | 32 | 75 | 39 |
| CF3CHFCHFCF2CF2CF3 | 87.6 | 1 | 99 | 10 | 97 | 32 | 75 | 39 |
| CF3CF2CF2CF2CH2CF3 | 77.7 | 1 | 99 | 10 | 97 | 32 | 75 | 39 |
| CF3CF2CF2CHFCHF2 | 86.8 | 1 | 99 | 10 | 97 | 32 | 75 | 39 |
| CF3CF2CF2CHFCF2CHF2 | 89.5 | 1 | 99 | 10 | 97 | 32 | 75 | 39 |
| CF3CF2CHFCF2CF2CHF2 | 91.2 | 1 | 99 | 10 | 97 | 32 | 75 | 39 |
| CF3CHFCF2CF2CF2CHF2 | 90.9 | 1 | 99 | 10 | 97 | 32 | 75 | 39 |
| CF3CF2CF2CF2CF2CH2F | 75.9 | 1 | 99 | 10 | 97 | 32 | 75 | 37 |
| CF2HCF2CF2CF2CF2CHF2 | 90.4 | 1 | 99 | 10 | 97 | 32 | 75 | 39 |
| CF2HCF2CF2CF2CF2CF3 | 71.4 | 1 | 95 | 10 | 93 | 31 | 72 | 37 |
| CF3CHFCF2CF2CF2CF3 | 71.9 | 1 | 95 | 10 | 93 | 31 | 72 | 37 |
| CF3CF2CHFCF2CF2CF3 | 72.2 | 1 | 95 | 10 | 93 | 31 | 72 | 37 |
| CF2HCF2CF2CF3 | 21.1 | 20 | 70 | 30 | 68 | 40 | 59 | 19 |
| CF3CHFCF2CF3 | 22.5 | 20 | 70 | 30 | 68 | 40 | 59 | 20 |
| CF2HCF2CF3 | −3.14 | 10 | 50 | 20 | 48 | 27 | 41 | −2 |
| CF3CHFCF3 | −2.99 | 10 | 50 | 20 | 48 | 27 | 41 | −2 |

TABLE 3

| 245eb azeotropes NBP (22.7° C.) | VP = 1.08 atm | 245eb Preferred Compositions (wt. %) | | 245eb More Preferred Compositions (wt. %) | | 245eb Most Preferred Compositions (wt. %) | | Azeo BP (° C.) |
| --- | --- | --- | --- | --- | --- | --- | --- | --- |
| STRUCTURE | est. BP (° C.) | Lower | Upper | Lower | Upper | Lower | Upper | (±1) |
| CF3CF2CF2CH2CH3 | 46.3 | 1 | 99 | 10 | 99 | 32 | 77 | 17 |
| CF3CF2CH2CF2CH3 | 59.4 | 1 | 99 | 10 | 99 | 32 | 77 | 19 |
| CF3CF2CHFCHFCH3 | 61.7 | 1 | 99 | 10 | 99 | 32 | 77 | 20 |
| CF2CH2CF2CF2CH3 | 67.2 | 1 | 99 | 10 | 99 | 32 | 77 | 20 |
| CF3CHFCF2CHFCH3 | 68 | 1 | 99 | 10 | 99 | 32 | 77 | 20 |
| CF3CHFCHFCF2CH3 | 72.9 | 1 | 99 | 10 | 99 | 32 | 77 | 21 |
| CF3CF2CHFCH2CH2F | 70 | 1 | 99 | 10 | 99 | 32 | 77 | 21 |
| CF3CF2CH2CHFCH2F | 75.2 | 1 | 99 | 10 | 99 | 32 | 77 | 21 |
| CF3CHFCF2CH2CH2F | 76.8 | 1 | 99 | 10 | 99 | 32 | 77 | 21 |
| CF3CHFCH2CF2CH2F | 83.1 | 1 | 99 | 10 | 99 | 32 | 77 | 21 |
| CF3CH2CF2CHFCH2F | 84.2 | 1 | 99 | 10 | 99 | 32 | 77 | 21 |
| CF3CH2CHFCF2CH2F | 85.4 | 1 | 99 | 10 | 99 | 32 | 77 | 21 |
| CF3CHFCHFCHFCH2F | 89.1 | 1 | 99 | 10 | 99 | 32 | 77 | 21 |
| CF3CF2CH2CH2CHF2 | 72.5 | 1 | 99 | 10 | 99 | 32 | 77 | 21 |
| CF3CH2CH2CF2CHF2 | 80.4 | 1 | 99 | 10 | 99 | 32 | 77 | 21 |
| CF3CH2CF2CH2CHF2 | 82 | 1 | 99 | 10 | 99 | 32 | 77 | 21 |
| CF3CHFCHFCH2CHF2 | 86.5 | 1 | 99 | 10 | 99 | 32 | 77 | 21 |
| CF3CHFCH2CHFCHF2 | 87.7 | 1 | 99 | 10 | 99 | 32 | 77 | 21 |
| CF3CH2CHFCHFCHF2 | 90.4 | 1 | 99 | 10 | 99 | 32 | 77 | 21 |
| CF3CH2CH2CHFCF3 | 72.9 | 1 | 99 | 10 | 99 | 32 | 77 | 21 |
| CF3CH2CHFCH2CF3 | 75.7 | 1 | 99 | 10 | 99 | 32 | 77 | 21 |
| CH2FCF2CF2CF2CH3 | 65.4 | 1 | 99 | 10 | 99 | 32 | 77 | 21 |
| CH2FCF2CH2CF2CHF2 | 79.7 | 1 | 99 | 10 | 99 | 32 | 77 | 21 |
| CH2FCF2CF2CH2CHF2 | 87.1 | 1 | 99 | 10 | 99 | 32 | 77 | 21 |
| CH2FCF2CH2CF2CHF2 | 87.2 | 1 | 99 | 10 | 99 | 32 | 77 | 21 |
| CH2FCHFCHFCF2CHF2 | 92.8 | 1 | 99 | 10 | 99 | 32 | 77 | 21 |
| CH2FCHFCF2CHFCHF2 | 95 | 1 | 99 | 10 | 99 | 32 | 77 | 21 |
| CH2FCF2CHFCHFCHF2 | 96.6 | 1 | 99 | 10 | 99 | 32 | 77 | 21 |
| CHF2CF2CF2CHFCH3 | 69.2 | 1 | 99 | 10 | 99 | 32 | 77 | 20 |

TABLE 3-continued

| 245eb azeotropes NBP (22.7° C.) STRUCTURE | VP = 1.08 atm est. BP (° C.) | 245eb Preferred Compositions (wt. %) Lower | 245eb Preferred Compositions (wt. %) Upper | 245eb More Preferred Compositions (wt. %) Lower | 245eb More Preferred Compositions (wt. %) Upper | 245eb Most Preferred Compositions (wt. %) Lower | 245eb Most Preferred Compositions (wt. %) Upper | Azeo BP (° C.) (±1) |
|---|---|---|---|---|---|---|---|---|
| CHF2CF2CHFCF2CH3 | 74.8 | 1 | 99 | 10 | 99 | 32 | 77 | 21 |
| CHF2CHFCF2CF2CH3 | 76.3 | 1 | 99 | 10 | 99 | 32 | 77 | 21 |
| CHF2CF2CHFCH2CHF2 | 91.9 | 1 | 99 | 10 | 99 | 32 | 77 | 21 |
| CHF2CHFCF2CH2CHF2 | 94.6 | 1 | 99 | 10 | 99 | 32 | 77 | 21 |
| CHF2CF2CH2CHFCHF2 | 93.6 | 1 | 99 | 10 | 99 | 32 | 77 | 21 |
| CHF2CHFCHFCHFCHF2 | 103.4 | 1 | 99 | 10 | 99 | 32 | 77 | 21 |
| CH2FCHFCF2CF2CH2F | 85.8 | 1 | 99 | 10 | 99 | 32 | 77 | 21 |
| CH2FCF2CHFCF2CH2F | 88.1 | 1 | 99 | 10 | 99 | 32 | 77 | 21 |
| CF3CH2CH2CF3 | 40.7 | 1 | 99 | 10 | 99 | 32 | 77 | 17 |
| CF3CHFCH2CHF2 | 50.8 | 1 | 99 | 10 | 99 | 32 | 77 | 18 |
| CF3CH2CHFCHF2 | 53 | 1 | 99 | 10 | 99 | 32 | 77 | 18 |
| CF3CF2CH2CH2F | 37.3 | 1 | 99 | 10 | 99 | 32 | 77 | 17 |
| CF3CHFCHFCH2F | 50.8 | 1 | 99 | 10 | 99 | 32 | 77 | 18 |
| CF3CH2CF2CH2F | 45.8 | 1 | 99 | 10 | 99 | 32 | 77 | 17 |
| CHF2CH2CF2CHF2 | 55.7 | 1 | 99 | 10 | 99 | 32 | 77 | 19 |
| CHF2CHFCHFCHF2 | 65.1 | 1 | 99 | 10 | 99 | 32 | 77 | 20 |
| CHF2CF2CHFCH2F | 55.3 | 1 | 99 | 10 | 99 | 32 | 77 | 19 |
| CHF2CHFCF2CH2F | 57.5 | 1 | 99 | 10 | 99 | 32 | 77 | 19 |
| CH2FCF2CF2CH2F | 49.2 | 1 | 99 | 10 | 99 | 32 | 77 | 18 |
| CHF2CF2CF2CH3 | 35.8 | 1 | 99 | 10 | 99 | 32 | 77 | 17 |
| CF3CF2CHFCH3 | 26 | 1 | 95 | 10 | 95 | 31 | 74 | 16 |
| CF3CHFCF2CH3 | 32 | 1 | 95 | 10 | 95 | 31 | 74 | 17 |
| CF3CHFCHFCF2CHFCH2F | 120.9 | 1 | 99 | 10 | 99 | 32 | 77 | 21 |
| CF3CH2CF2CF2CHFCH2F | 112.7 | 1 | 99 | 10 | 99 | 32 | 77 | 21 |
| CF3CF2CHFCH2CF2CH2F | 106.9 | 1 | 99 | 10 | 99 | 32 | 77 | 21 |
| CF3CHFCF2CF2CH2CH2F | 111.2 | 1 | 99 | 10 | 99 | 32 | 77 | 21 |
| CF3CH2CF2CHFCF2CH2F | 110.3 | 1 | 99 | 10 | 99 | 32 | 77 | 21 |
| CF3CHFCHFCHFCF2CH2F | 121.8 | 1 | 99 | 10 | 99 | 32 | 77 | 21 |
| CF3CH2CF2CFHCF2CH2F | 114.2 | 1 | 99 | 10 | 99 | 32 | 77 | 21 |
| CF3CHFCF2CF2CF2CH2F | 113.4 | 1 | 99 | 10 | 99 | 32 | 77 | 21 |
| CF3CH2CHFCF2CF2CH2F | 113.1 | 1 | 99 | 10 | 99 | 32 | 77 | 21 |
| CF3CHFCH2CF2CHFCHF2 | 120.9 | 1 | 99 | 10 | 99 | 32 | 77 | 21 |
| CF3CH2CHFCF2CHFCHF2 | 122.2 | 1 | 99 | 10 | 99 | 32 | 77 | 21 |
| CF2CF2CH2CH2CF2CHF2 | 104.6 | 1 | 99 | 10 | 99 | 32 | 77 | 21 |
| CF3CHFCHFCH2CF2CHF2 | 117.8 | 1 | 99 | 10 | 99 | 32 | 77 | 21 |
| CF3CH2CF2CH2CF2CHF2 | 112.4 | 1 | 99 | 10 | 99 | 32 | 77 | 21 |
| CF3CHFCH2CHFCF2CHF2 | 117.3 | 1 | 99 | 10 | 99 | 32 | 77 | 21 |
| CF3CH2CF2CF2CF2CHF2 | 107.3 | 1 | 99 | 10 | 99 | 32 | 77 | 21 |
| CF3CH2CHFCHFCF2CHF2 | 119.2 | 1 | 99 | 10 | 99 | 32 | 77 | 21 |
| CF3CF2CF2CF2CH2CH3 | 71.4 | 1 | 99 | 10 | 99 | 32 | 77 | 21 |
| CF3CF2CF2CHFCHFCH3 | 86 | 1 | 99 | 10 | 99 | 32 | 77 | 21 |
| CF3CF2CHFCF2CHFCH3 | 93.5 | 1 | 99 | 10 | 99 | 32 | 77 | 21 |
| CF3CHFCF2CF2CHFCH3 | 94.9 | 1 | 99 | 10 | 99 | 32 | 77 | 21 |
| CF3CF2CF2CH2CF2CH3 | 82.8 | 1 | 99 | 10 | 99 | 32 | 77 | 21 |
| CF3CF2CHFCHFCF2CH3 | 97.5 | 1 | 99 | 10 | 99 | 32 | 77 | 21 |
| CF3CHFCF2CHFCF2CH3 | 99.6 | 1 | 99 | 10 | 99 | 32 | 77 | 21 |
| CF3CH2CF2CF2CF2CH3 | 93 | 1 | 99 | 10 | 99 | 32 | 77 | 21 |
| CF3CHFCHFCF2CF2CH3 | 102.3 | 1 | 99 | 10 | 99 | 32 | 77 | 21 |
| CF3CH2CF2CF2CF2CH3 | 92.4 | 1 | 99 | 10 | 99 | 32 | 77 | 21 |
| CHF2CF2CF2CHFCH2CHF2 | 117.8 | 1 | 99 | 10 | 99 | 32 | 77 | 21 |
| CHF2CF2CHFCF2CH2CHF2 | 122.4 | 1 | 99 | 10 | 99 | 32 | 77 | 21 |
| CHF2CHFCF2CF2CH2CHF2 | 123.1 | 1 | 99 | 10 | 99 | 32 | 77 | 21 |
| CF3CF2CHFCH2CHFCHF2 | 120.4 | 1 | 99 | 10 | 99 | 32 | 77 | 21 |
| CHF2CF2CHFCHFCHFCHF2 | 132.1 | 1 | 99 | 10 | 99 | 32 | 77 | 21 |
| CHF2CHFCF2CHFCHFCHF2 | 133.5 | 1 | 99 | 10 | 99 | 32 | 77 | 21 |
| CGF2CF2CH2CF2CHFCHF2 | 124.9 | 1 | 99 | 10 | 99 | 32 | 77 | 21 |
| CHF2CF2CHFCH2CF2CHF2 | 123.1 | 1 | 99 | 10 | 99 | 32 | 77 | 21 |
| CHF2CF2CF2CF2CH2CH2F | 104.8 | 1 | 99 | 10 | 99 | 32 | 77 | 21 |
| CHF2CF2CF2CHFCHFCH2F | 118.7 | 1 | 99 | 10 | 99 | 32 | 77 | 21 |
| CHF2CF2CHFCF2CHFCH2F | 122.9 | 1 | 99 | 10 | 99 | 32 | 77 | 21 |
| CHF2CHFCF2CF2CHFCH2F | 121.8 | 1 | 99 | 10 | 99 | 32 | 77 | 21 |
| CHF2CF2CF2CH2CF2CH2F | 114.1 | 1 | 99 | 10 | 99 | 32 | 77 | 21 |
| CHF2CF2CHFCHFCF2CH2F | 125.4 | 1 | 99 | 10 | 99 | 32 | 77 | 21 |
| CHF2CHFCF2CHFCF2CH2F | 125 | 1 | 99 | 10 | 99 | 32 | 77 | 21 |
| CHF2CF2CH2CF2CF2CH2F | 117.5 | 1 | 99 | 10 | 99 | 32 | 77 | 21 |
| CHF2CHFCHFCF2CF2CH2F | 124.2 | 1 | 99 | 10 | 99 | 32 | 77 | 21 |
| CH2CH2CF2CF2CF2CH2F | 112.2 | 1 | 99 | 10 | 99 | 32 | 77 | 21 |
| CF2HCF2CF2CF2CHFCH3 | 94.4 | 1 | 99 | 10 | 99 | 32 | 77 | 21 |
| CF2HCF2CF2CHFCF2CH3 | 100.8 | 1 | 99 | 10 | 99 | 32 | 77 | 21 |
| CHF2CF2CHFCF2CF2CH3 | 104.2 | 1 | 99 | 10 | 99 | 32 | 77 | 21 |
| CHF2CHFCF2CF2CF2CH3 | 101.4 | 1 | 99 | 10 | 99 | 32 | 77 | 21 |
| CH2FCF2CF2CF2CF2CH3 | 90.6 | 1 | 99 | 10 | 99 | 32 | 77 | 21 |
| CH2FCF2CF2CF2CHFCH2F | 110.9 | 1 | 99 | 10 | 99 | 32 | 77 | 21 |

TABLE 3-continued

| 245eb azeotropes NBP (22.7° C.) STRUCTURE | VP = 1.08 atm est. BP (° C.) | 245eb Preferred Compositions (wt. %) | | 245eb More Preferred Compositions (wt. %) | | 245eb Most Preferred Compositions (wt. %) | | Azeo BP (° C.) (±1) |
|---|---|---|---|---|---|---|---|---|
| | | Lower | Upper | Lower | Upper | Lower | Upper | |
| CH2FCF2CF2CHFCF2CH2F | 115.9 | 1 | 99 | 10 | 99 | 32 | 77 | 21 |
| CF3CH2CH2CHFCF2CF3 | 96.7 | 1 | 99 | 10 | 99 | 32 | 77 | 21 |
| CF3CH2CH2CF2CHFCF3 | 104.4 | 1 | 99 | 10 | 99 | 32 | 77 | 21 |
| CF3CF2CH2CHFCH2CF3 | 100.7 | 1 | 99 | 10 | 99 | 32 | 77 | 21 |
| CF3CHFCHFCHFCH2CF3 | 115.5 | 1 | 99 | 10 | 99 | 32 | 77 | 21 |
| CF3CH2CF2CHFCH2CF3 | 111.4 | 1 | 99 | 10 | 99 | 32 | 77 | 21 |
| CF3CHFCH2CF2CH2CF3 | 108.4 | 1 | 99 | 10 | 99 | 32 | 77 | 21 |
| CF3CHFCH2CH2CF2CF3 | 97.1 | 1 | 99 | 10 | 99 | 32 | 77 | 21 |
| CF3CHFCHFCH2CHFCF3 | 112 | 1 | 99 | 10 | 99 | 32 | 77 | 21 |
| CF3CF2CF2CH2CH2CHF2 | 95.9 | 1 | 99 | 10 | 99 | 32 | 77 | 21 |
| CF3CF2CHFCHFCH2CHF2 | 111.2 | 1 | 99 | 10 | 99 | 32 | 77 | 21 |
| CF3CHFCF2CHFCH2CHF2 | 116.6 | 1 | 99 | 10 | 99 | 32 | 77 | 21 |
| CF3CF2CH2CF2CH2CHF2 | 107.9 | 1 | 99 | 10 | 99 | 32 | 77 | 21 |
| CF3CHFCHFCF2CH2CHF2 | 120.5 | 1 | 99 | 10 | 99 | 32 | 77 | 21 |
| CF3CH2CF2CF2CH2CHF2 | 114 | 1 | 99 | 10 | 99 | 32 | 77 | 21 |
| CF3CF2CHFCH2CHFCHF2 | 111.5 | 1 | 99 | 10 | 99 | 32 | 77 | 21 |
| CF3CHFCF2CH2CHFCHF2 | 117.4 | 1 | 99 | 10 | 99 | 32 | 77 | 21 |
| CF3CF2CH2CHFCHFCHF2 | 115.4 | 1 | 99 | 10 | 99 | 32 | 77 | 21 |
| CF3CHFCHFCHFCHFCHF2 | 128.5 | 1 | 99 | 10 | 99 | 32 | 77 | 21 |
| CF3CH2CF2CHFCHFCHF2 | 122.7 | 1 | 99 | 10 | 99 | 32 | 77 | 21 |
| CF3CF2CF2CHFCH2CH2F | 94.3 | 1 | 99 | 10 | 99 | 32 | 77 | 21 |
| CF3CF2CHFCF2CH2CH2F | 102.3 | 1 | 99 | 10 | 99 | 32 | 77 | 21 |
| CF3CHFCF2CF2CH2CH2F | 105.3 | 1 | 99 | 10 | 99 | 32 | 77 | 21 |
| CF3CF2CF2CH2CHFCH2F | 98.6 | 1 | 99 | 10 | 99 | 32 | 77 | 21 |
| CF3CF2CHFCHFCHFCH2F | 113.8 | 1 | 99 | 10 | 99 | 32 | 77 | 21 |
| CF3CHFCF2CHFCHFCH2F | 117.5 | 1 | 99 | 10 | 99 | 32 | 77 | 21 |
| CF3CF2CH2CF2CHFCH2F | 110 | 1 | 99 | 10 | 99 | 32 | 77 | 21 |
| CH3CHFCF2CF2CF3 | 50.2 | 1 | 99 | 10 | 99 | 32 | 77 | 19 |
| CH3CF2CFHCF2CF3 | 57.5 | 1 | 99 | 10 | 99 | 32 | 77 | 19 |
| CH3CF2CF2CHFCF3 | 60.9 | 1 | 99 | 10 | 99 | 32 | 77 | 20 |
| CH2FCH2CF2CF2CF3 | 60.7 | 1 | 99 | 10 | 99 | 32 | 77 | 20 |
| CH2FCHFCHFCF2CF3 | 75.5 | 1 | 99 | 10 | 99 | 32 | 77 | 21 |
| CH2FCHFCF2CHFCF3 | 80.1 | 1 | 99 | 10 | 99 | 32 | 77 | 21 |
| CH2FCF2CH2CF2CF3 | 71.6 | 1 | 99 | 10 | 99 | 32 | 77 | 21 |
| CH2FCF2CHFCHFCF3 | 83.5 | 1 | 99 | 10 | 99 | 32 | 77 | 21 |
| CH2FCF2CF2CH2CF3 | 76.1 | 1 | 99 | 10 | 99 | 32 | 77 | 21 |
| CF2HCH2CHFCF2CF3 | 74.6 | 1 | 99 | 10 | 99 | 32 | 77 | 21 |
| CF2HCH2CF2CHFCF3 | 79.7 | 1 | 99 | 10 | 99 | 32 | 77 | 21 |
| CF2HCHFCH2CF2CF3 | 77.9 | 1 | 99 | 10 | 99 | 32 | 77 | 21 |
| CF2HCHFCHFCHFCF3 | 90.2 | 1 | 99 | 10 | 99 | 32 | 77 | 21 |
| CF2HCHFCF2CH2CF3 | 83.5 | 1 | 99 | 10 | 99 | 32 | 77 | 21 |
| CF2HCF2CH2CFHCF3 | 82 | 1 | 99 | 10 | 99 | 32 | 77 | 21 |
| CF2HCF2CHFCH2CF3 | 82.6 | 1 | 99 | 10 | 99 | 32 | 77 | 21 |
| CF3CH2CH2CF2CF3 | 64.8 | 1 | 99 | 10 | 99 | 32 | 77 | 21 |
| CF3CH2CHFCHFCF3 | 77.2 | 1 | 99 | 10 | 99 | 32 | 77 | 21 |
| CF3CH2CF2CH2CF3 | 71 | 1 | 99 | 10 | 99 | 32 | 77 | 21 |
| CF3CHFCH2CHFCF3 | 76.2 | 1 | 99 | 10 | 99 | 32 | 77 | 21 |
| CH2FCF2CHFCF2CF2H | 85.4 | 1 | 99 | 10 | 99 | 32 | 77 | 21 |
| CH2FCF2CF2CHFCF2H | 85.2 | 1 | 99 | 10 | 99 | 32 | 77 | 21 |
| CH2FCHFCF2CF2CF2H | 81.3 | 1 | 99 | 10 | 99 | 32 | 77 | 21 |
| CH3CF2CF2CF2CF2H | 60.9 | 1 | 99 | 10 | 99 | 32 | 77 | 20 |
| CF2HCH2CF2CF2CF2H | 82.6 | 1 | 99 | 10 | 99 | 32 | 77 | 21 |
| CF2HCHFCHFCF2CF2H | 93.8 | 1 | 99 | 10 | 99 | 32 | 77 | 21 |
| CF2HCHFCF2CHFCF2H | 94.3 | 1 | 99 | 10 | 99 | 32 | 77 | 21 |
| CF2HCF2CH2CF2CF2H | 86.1 | 1 | 99 | 10 | 99 | 32 | 77 | 21 |
| CH2FCF2CF2CF2CH2F | 74.3 | 1 | 99 | 10 | 99 | 32 | 77 | 21 |
| CF3CF2CF2CH2CH2CF3 | 88.3 | 1 | 99 | 10 | 99 | 32 | 77 | 21 |
| CF3CF2CHFCHFCH2CF3 | 101.9 | 1 | 99 | 10 | 99 | 32 | 77 | 21 |
| CF3CHFCF2CHFCH2CF3 | 107.3 | 1 | 99 | 10 | 99 | 32 | 77 | 21 |
| CF3CF2CH2CF2CH2CF3 | 96.9 | 1 | 99 | 10 | 99 | 32 | 77 | 21 |
| CF3CHFCHFCF2CH2CF3 | 109.5 | 1 | 99 | 10 | 99 | 32 | 77 | 21 |
| CF3CH2CF2CF2CH2CF3 | 103 | 1 | 99 | 10 | 99 | 32 | 77 | 21 |
| CF3CHFCH2CHFCF2CF3 | 100 | 1 | 99 | 10 | 99 | 32 | 77 | 21 |
| CF3CHFCH2CF2CHFCF3 | 10.6 | 1 | 99 | 10 | 99 | 32 | 77 | 21 |
| CF3CHFCHFCH2CF2CF3 | 102.2 | 1 | 99 | 10 | 99 | 32 | 77 | 21 |
| CF3CHFCHFCHFCHFCF3 | 115.3 | 1 | 99 | 10 | 99 | 32 | 77 | 21 |
| CF3CF2CH2CH2CF2CF3 | 89 | 1 | 99 | 10 | 99 | 32 | 77 | 21 |
| CF3CF2CF2CHFCH2CHF2 | 98.8 | 1 | 99 | 10 | 99 | 32 | 77 | 21 |
| CF3CF2CHFCF2CH2CHF2 | 105.1 | 1 | 99 | 10 | 99 | 32 | 77 | 21 |
| CF3CHFCF2CF2CHFCHF2 | 108.2 | 1 | 99 | 10 | 99 | 32 | 77 | 21 |
| CF3CF2CF2CH2CHFCHF2 | 101.4 | 1 | 99 | 10 | 99 | 32 | 77 | 21 |
| CF3CF2CHFCHFCHFCHF2 | 114.8 | 1 | 99 | 10 | 99 | 32 | 77 | 21 |
| CF3CHFCF2CHFCHFCHF2 | 118.6 | 1 | 99 | 10 | 99 | 32 | 77 | 21 |

TABLE 3-continued

| 245eb azeotropes NBP (22.7° C.) STRUCTURE | VP = 1.08 atm est. BP (° C.) | 245eb Preferred Compositions (wt. %) Lower | 245eb Preferred Compositions (wt. %) Upper | 245eb More Preferred Compositions (wt. %) Lower | 245eb More Preferred Compositions (wt. %) Upper | 245eb Most Preferred Compositions (wt. %) Lower | 245eb Most Preferred Compositions (wt. %) Upper | Azeo BP (° C.) (±1) |
|---|---|---|---|---|---|---|---|---|
| CF3CF2CH2CF2CHFCHF2 | 109.4 | 1 | 99 | 10 | 99 | 32 | 77 | 21 |
| CF3CHFCHFCF2CHFCHF2 | 120.3 | 1 | 99 | 10 | 99 | 32 | 77 | 21 |
| CF3CH2CF2CF2CHFCHF2 | 112.1 | 1 | 99 | 10 | 99 | 32 | 77 | 21 |
| CF3CF2CHFCH2CF2CHF2 | 105.8 | 1 | 99 | 10 | 99 | 32 | 77 | 21 |
| CF3CHFCF2CH2CF2CHF2 | 110.1 | 1 | 99 | 10 | 99 | 32 | 77 | 21 |
| CF3CF2CH2CHFCF2CHF2 | 107.5 | 1 | 99 | 10 | 99 | 32 | 77 | 21 |
| CF3CHFCHFCHFCF2CHF2 | 118.9 | 1 | 99 | 10 | 99 | 32 | 77 | 21 |
| CF3CH2CF2CHFCF2CHF2 | 111.4 | 1 | 99 | 10 | 99 | 32 | 77 | 21 |
| CF3CHFCH2CF2CF2CHF2 | 108.9 | 1 | 99 | 10 | 99 | 32 | 77 | 21 |
| CF3CH2CHFCF2CF2CHF2 | 108.5 | 1 | 99 | 10 | 99 | 32 | 77 | 21 |
| CF3CF2CF2CF2CH2CH2F | 85.8 | 1 | 99 | 10 | 99 | 32 | 77 | 21 |
| CF3CF2CF2CHFCHFCH2F | 99.7 | 1 | 99 | 10 | 99 | 32 | 77 | 21 |
| CF3CF2CHFCF2CHFCH2F | 105.6 | 1 | 99 | 10 | 99 | 32 | 77 | 21 |
| CF3CHFCF2CF2CHFCH2F | 106.9 | 1 | 99 | 10 | 99 | 32 | 77 | 21 |
| CF3CF2CF2CH2CF2CH2F | 95.1 | 1 | 99 | 10 | 99 | 32 | 77 | 21 |
| CF3CF2CHFCHFCF2CH2F | 108.1 | 1 | 99 | 10 | 99 | 32 | 77 | 21 |
| CF3CHFCF2CHFCF2CH2F | 110.1 | 1 | 99 | 10 | 99 | 32 | 77 | 21 |
| CF3CH2CF2CF2CF2CH2F | 101.9 | 1 | 99 | 10 | 99 | 32 | 77 | 21 |
| CF3CHFCHFCF2CF2CH2F | 111.4 | 1 | 99 | 10 | 99 | 32 | 77 | 21 |
| CHF2CF2CHFCF2CF2CH2F | 101.2 | 1 | 99 | 10 | 99 | 32 | 77 | 21 |
| CF3CF2CF2CF2CHFCH3 | 75.4 | 1 | 99 | 10 | 99 | 32 | 77 | 21 |
| CF3CF2CHFCF2CF2CH3 | 81.8 | 1 | 99 | 10 | 99 | 32 | 77 | 21 |
| CF3CF2CHFCF2CF2CH3 | 86.9 | 1 | 99 | 10 | 99 | 32 | 77 | 21 |
| CF3CHFCF2CF2CF2CH3 | 86.6 | 1 | 99 | 10 | 99 | 32 | 77 | 21 |
| CHF2CF2CF2CHFCHFCHF2 | 119.8 | 1 | 99 | 10 | 99 | 32 | 77 | 21 |
| CHF2CHFCF2CF2CHFCHF2 | 122.2 | 1 | 99 | 10 | 99 | 32 | 77 | 21 |
| CHF2CHFCF2CF2CHFCHF2 | 121.2 | 1 | 99 | 10 | 99 | 32 | 77 | 21 |
| CHF2CF2CF2CH2CF2CHF2 | 113 | 1 | 99 | 10 | 99 | 32 | 77 | 21 |
| CHF2CF2CHFCHFCF2CHF2 | 122.6 | 1 | 99 | 10 | 99 | 32 | 77 | 21 |
| CHF2CH2CF2CF2CF2CHF2 | 107.7 | 1 | 99 | 10 | 99 | 32 | 77 | 21 |
| CHF2CF2CF2CF2CHFCH2F | 106.4 | 1 | 99 | 10 | 99 | 32 | 77 | 21 |
| CHF2CF2CF2CHFCF2CH2F | 111.4 | 1 | 99 | 10 | 99 | 32 | 77 | 21 |
| CHF2CF2CHFCF2CF2CH2F | 113.1 | 1 | 99 | 10 | 99 | 32 | 77 | 21 |
| CHF2CHFCF2CF2CF2CH2F | 110.3 | 1 | 99 | 10 | 99 | 32 | 77 | 21 |
| CH2FCF2CF2CF2CF2CH2F | 99.4 | 1 | 99 | 10 | 99 | 32 | 77 | 21 |
| CHFCF2CF2CF2CF2CH3 | 86.1 | 1 | 99 | 10 | 99 | 32 | 77 | 21 |
| CH3CF2CF2CF3 | 16.8 | 1 | 80 | 10 | 80 | 28 | 63 | 10 |
| CH2FCHFCF2CF3 | 38 | 1 | 95 | 10 | 95 | 31 | 74 | 16 |
| CH2FCF2CHFCF3 | 42.6 | 1 | 99 | 10 | 99 | 32 | 77 | 17 |
| CH2FCF2CH2CF3 | 44.7 | 1 | 99 | 10 | 99 | 32 | 77 | 17 |
| CF2HCH2CF2CF3 | 40.2 | 1 | 99 | 10 | 99 | 32 | 77 | 17 |
| CF2HCHFCHFCF3 | 51.9 | 1 | 99 | 10 | 99 | 32 | 77 | 18 |
| CF3CH2CHFCF3 | 41.5 | 1 | 99 | 10 | 99 | 32 | 77 | 17 |
| CH2FCF2CF2CF2H | 44.7 | 1 | 99 | 10 | 99 | 32 | 77 | 17 |
| CF2HCHFCF2CF2H | 54.7 | 1 | 99 | 10 | 99 | 32 | 77 | 18 |
| CF3CF2CHFCH2CF3 | 65.3 | 1 | 99 | 10 | 99 | 32 | 77 | 21 |
| CF3CH2CF2CHFCF3 | 68.6 | 1 | 99 | 10 | 99 | 32 | 77 | 21 |
| CF3CHFCH2CF2CF3 | 66.5 | 1 | 99 | 10 | 99 | 32 | 77 | 21 |
| CF3CHFCHFCHFCF3 | 77 | 1 | 99 | 10 | 99 | 32 | 77 | 21 |
| CF3CH2CF2CF2CHF2 | 71.6 | 1 | 99 | 10 | 99 | 32 | 77 | 21 |
| CF3CHFCHFCF2CHF2 | 80.6 | 1 | 99 | 10 | 99 | 32 | 77 | 21 |
| CF3CF2CH2CF2CHF2 | 70.5 | 1 | 99 | 10 | 99 | 32 | 77 | 21 |
| CF3CHFCF2CHFCHF2 | 79.5 | 1 | 99 | 10 | 99 | 32 | 77 | 21 |
| CF3CF2CHFCHFCHF2 | 76.5 | 1 | 99 | 10 | 99 | 32 | 77 | 21 |
| CF3CF2CF2CH2CHF2 | 63.6 | 1 | 99 | 10 | 99 | 32 | 77 | 21 |
| CF3CF2CF2CHFCH2F | 62.3 | 1 | 99 | 10 | 99 | 32 | 77 | 21 |
| CF3CF2CHFCF2CH2F | 68.1 | 1 | 99 | 10 | 99 | 32 | 77 | 21 |
| CF3CHFCF2CF2CH2F | 70.3 | 1 | 99 | 10 | 99 | 32 | 77 | 21 |
| CF3CF2CF2CF2CH3 | 41.9 | 1 | 99 | 10 | 99 | 32 | 77 | 21 |
| CHF2CF2CF2CHFCHF2 | 80.7 | 1 | 99 | 10 | 99 | 32 | 77 | 21 |
| CHF2CF2CHFCF2CHF2 | 82.6 | 1 | 99 | 10 | 99 | 32 | 77 | 21 |
| CHF2CF2CF2CF2CH2F | 69.8 | 1 | 99 | 10 | 99 | 32 | 77 | 21 |
| CH3(CF2)4CF3 | 67.1 | 1 | 99 | 10 | 99 | 32 | 77 | 21 |
| CH2FCHF(CF2)3CF3 | 87.4 | 1 | 99 | 10 | 99 | 32 | 77 | 21 |
| CH2FCF2CHFCF2CF2CF3 | 92.3 | 1 | 99 | 10 | 99 | 32 | 77 | 21 |
| CH2FCF2CF2CHFCF2CF3 | 95.8 | 1 | 99 | 10 | 99 | 32 | 77 | 21 |
| CH2F(CF2)3CHFCF3 | 95.4 | 1 | 99 | 10 | 99 | 32 | 77 | 21 |
| CF2HCH2(CF2)3CF3 | 88.7 | 1 | 99 | 10 | 99 | 32 | 77 | 21 |
| CF2HCHFCHFCF2CF2CF3 | 100.8 | 1 | 99 | 10 | 99 | 32 | 77 | 21 |
| CF2HCHFCF2CHFCF2CF3 | 104.9 | 1 | 99 | 10 | 99 | 32 | 77 | 21 |
| CF2HCHFCF2CF2CHFCF3 | 106.3 | 1 | 99 | 10 | 99 | 32 | 77 | 21 |
| CF2HCF2CH2CF2CF2CF3 | 94 | 1 | 99 | 10 | 99 | 32 | 77 | 21 |
| CF2HCF2CHFCHFCF2CF3 | 105.3 | 1 | 99 | 10 | 99 | 32 | 77 | 21 |

TABLE 3-continued

| 245eb azeotropes NBP (22.7° C.) STRUCTURE | VP = 1.08 atm est. BP (° C.) | 245eb Preferred Compositions (wt. %) Lower | 245eb Preferred Compositions (wt. %) Upper | 245eb More Preferred Compositions (wt. %) Lower | 245eb More Preferred Compositions (wt. %) Upper | 245eb Most Preferred Compositions (wt. %) Lower | 245eb Most Preferred Compositions (wt. %) Upper | Azeo BP (° C.) (±1) |
|---|---|---|---|---|---|---|---|---|
| CF2HCF2CHFCF2CHFCF3 | 107.3 | 1 | 99 | 10 | 99 | 32 | 77 | 21 |
| CF2HCF2CF2CH2CF2CF3 | 97.4 | 1 | 99 | 10 | 99 | 32 | 77 | 21 |
| CF2HCF2CF2CHFCHFCF3 | 106.6 | 1 | 99 | 10 | 99 | 32 | 77 | 21 |
| CF2H(CF2)3CH2CF3 | 96.7 | 1 | 99 | 10 | 99 | 32 | 77 | 21 |
| CF3CH2CHFCF2CF2CF3 | 89.5 | 1 | 99 | 10 | 99 | 32 | 77 | 21 |
| CF3CH2CF2CHFCF2CF3 | 94.1 | 1 | 99 | 10 | 99 | 32 | 77 | 21 |
| CF3CHFCF2CF2CH2CF3 | 97.2 | 1 | 99 | 10 | 99 | 32 | 77 | 21 |
| CF3CF2CF2CH2CHFCF3 | 89.9 | 1 | 99 | 10 | 99 | 32 | 77 | 21 |
| CF3CHFCHFCHFCF2CF3 | 101.6 | 1 | 99 | 10 | 99 | 32 | 77 | 21 |
| CF3CHFCF2CHFCHFCF3 | 105.4 | 1 | 99 | 10 | 99 | 32 | 77 | 21 |
| CF3CHFCF2CH2CF2CF3 | 94.5 | 1 | 99 | 10 | 99 | 32 | 77 | 21 |
| CF3CF2CH2CHFCF2CF3 | 90.2 | 1 | 99 | 10 | 99 | 32 | 77 | 21 |
| CH2F(CF2)4CF2H | 94.9 | 1 | 99 | 10 | 99 | 32 | 77 | 21 |
| CF2HCHF(CF2)3CF2H | 105.8 | 1 | 99 | 10 | 99 | 32 | 77 | 21 |
| CF2HCF2CHFCF2CF2CF2H | 108.5 | 1 | 99 | 10 | 99 | 32 | 77 | 21 |
| CF3CHFCHFCF3 | 38.7 | 1 | 95 | 10 | 95 | 31 | 74 | 17 |
| CF3CF2CF2CH2F | 25.7 | 1 | 90 | 10 | 90 | 30 | 70 | 16 |
| CF3CF2CHFCHF2 | 37.4 | 1 | 95 | 10 | 95 | 31 | 74 | 17 |
| CF3CHFCF2CHF2 | 39.8 | 1 | 95 | 10 | 95 | 31 | 74 | 17 |
| CF3CF2CH2CHF2 | 29.1 | 1 | 90 | 10 | 90 | 30 | 70 | 16 |
| CHF2CF2CF2CHF2 | 40.1 | 1 | 95 | 10 | 95 | 31 | 74 | 17 |
| CH2FCF2CF2CH2CF3 | 50.8 | 1 | 99 | 10 | 99 | 32 | 77 | 18 |
| CF2HCHFCF2CF2CF3 | 61.7 | 1 | 99 | 10 | 99 | 32 | 77 | 19 |
| CF2HCF2CHFCF2CF3 | 65.3 | 1 | 99 | 10 | 99 | 32 | 77 | 19 |
| CF2HCF2CF2CHFCF3 | 65.8 | 1 | 99 | 10 | 99 | 32 | 77 | 19 |
| CF3CH2CF2CF2CF3 | 52.6 | 1 | 99 | 10 | 99 | 32 | 77 | 19 |
| CF3CF2CHFCHFCF3 | 63.3 | 1 | 99 | 10 | 99 | 32 | 77 | 20 |
| CF3CHFCF2CHFCF3 | 64.6 | 1 | 99 | 10 | 99 | 32 | 77 | 20 |
| CF3CF2CH2CF2CF3 | 55 | 1 | 99 | 10 | 99 | 32 | 77 | 19 |
| CF2HCF2CF2CF2CF2H | 65.3 | 1 | 99 | 10 | 99 | 32 | 77 | 20 |
| CF3CF2CHFCHFCF2CF3 | 88 | 1 | 99 | 10 | 99 | 32 | 77 | 21 |
| CF3CF2CF2CH2CF2CF3 | 78.4 | 1 | 99 | 10 | 99 | 32 | 77 | 21 |
| CF3CHFCF2CF2CHFCF3 | 91.4 | 1 | 99 | 10 | 99 | 32 | 77 | 21 |
| CF3CF2CHFCF2CHFCF3 | 90 | 1 | 99 | 10 | 99 | 32 | 77 | 21 |
| CF3CHFCHFCF2CF2CF3 | 87.6 | 1 | 99 | 10 | 99 | 32 | 77 | 21 |
| CF3CF2CF2CF2CH2CF3 | 77.7 | 1 | 99 | 10 | 99 | 32 | 77 | 21 |
| CF3CF2CF2CF2CHFCHF2 | 86.8 | 1 | 99 | 10 | 99 | 32 | 77 | 21 |
| CF3CF2CF2CHFCF2CHF2 | 89.5 | 1 | 99 | 10 | 99 | 32 | 77 | 21 |
| CF3CF2CHFCF2CF2CHF2 | 91.2 | 1 | 99 | 10 | 99 | 32 | 77 | 21 |
| CF3CHFCF2CF2CF2CHF2 | 90.9 | 1 | 99 | 10 | 99 | 32 | 77 | 21 |
| CF3CF2CF2CF2CF2CH2F | 75.9 | 1 | 99 | 10 | 99 | 32 | 77 | 21 |
| CF2HCF2CF2CF2CF2CHF2 | 90.4 | 1 | 99 | 10 | 99 | 32 | 77 | 21 |
| CF2HCF2CF2CF2CF2CF3 | 71.4 | 1 | 99 | 10 | 99 | 32 | 77 | 21 |
| CF3CHFCF2CF2CF2CF3 | 71.9 | 1 | 99 | 10 | 99 | 32 | 77 | 21 |
| CF3CF2CHFCF2CF2CF3 | 72.2 | 1 | 99 | 10 | 99 | 32 | 77 | 21 |
| CF2HCF2CF2CF3 | 21.1 | 1 | 90 | 10 | 80 | 28 | 63 | 15 |
| CF3CHFCF2CF3 | 22.5 | 1 | 90 | 10 | 80 | 28 | 63 | 15 |
| CF2HCF2CF3 | −3.14 | 1 | 60 | 10 | 50 | 20 | 40 | −6 |
| CF3CHFCF3 | −2.99 | 1 | 60 | 10 | 50 | 20 | 40 | −6 |

TABLE 4

| 245fa azeotropes at 25° C. NBP = 15.3° C. STRUCTURE | VP = 1.43 atm est. BP (° C.) | 245fa Preferred Compositions wt. % Lower | 245fa Preferred Compositions wt. % Upper | 245fa More Preferred Compositions wt. % Lower | 245fa More Preferred Compositions wt. % Upper | 245fa Most Preferred Compositions wt. % Lower | 245fa Most Preferred Compositions wt. % Upper | Azeo NBP (° C.) (±1) |
|---|---|---|---|---|---|---|---|---|
| CF3CF2CF2CH2CH3 | 46.3 | 60 | 99 | 70 | 99 | 77 | 92 | 12 |
| CF3CF2CH2CF2CH3 | 59.4 | 65 | 99 | 75 | 99 | 81 | 93 | 13 |
| CF3CF2CHFCHFCH3 | 61.7 | 66 | 99 | 76 | 99 | 82 | 93 | 13 |
| CF2CH2CF2CF2CH3 | 67.2 | 68 | 99 | 78 | 99 | 84 | 94 | 13 |
| CF3CHFCF2CHFCH3 | 68 | 69 | 99 | 79 | 99 | 84 | 94 | 13 |
| CF3CHFCHFCF2CH3 | 72.9 | 70 | 99 | 80 | 99 | 85 | 94 | 14 |
| CF3CF2CHFCH2CH2F | 70 | 69 | 99 | 79 | 99 | 84 | 94 | 14 |
| CF3CF2CH2CHFCH2F | 75.2 | 71 | 99 | 81 | 99 | 86 | 95 | 14 |
| CF3CHFCF2CH2CH2F | 76.8 | 72 | 99 | 82 | 99 | 86 | 95 | 14 |
| CF3CHFCH2CF2CH2F | 83.1 | 74 | 99 | 84 | 99 | 87 | 95 | 14 |
| CF3CH2CF2CHFCH2F | 84.2 | 74 | 99 | 84 | 99 | 88 | 95 | 14 |
| CF3CH2CHFCF2CH2F | 85.4 | 74 | 99 | 84 | 99 | 88 | 95 | 14 |

TABLE 4-continued

| 245fa azeotropes at 25° C. NBP = 15.3° C. STRUCTURE | VP = 1.43 atm est. BP (° C.) | 245fa Preferred Compositions wt. % | | 245fa More Preferred Compositions wt. % | | 245fa Most Preferred Compositions wt. % | | Azeo NBP (° C.) (±1) |
|---|---|---|---|---|---|---|---|---|
| | | Lower | Upper | Lower | Upper | Lower | Upper | |
| CF3CHFCHFCHFCH2F | 89.1 | 75 | 99 | 85 | 99 | 89 | 96 | 14 |
| CF3CF2CH2CH2CHF2 | 72.5 | 70 | 99 | 80 | 99 | 85 | 94 | 14 |
| CF3CH2CH2CF2CHF2 | 80.4 | 73 | 99 | 83 | 99 | 87 | 95 | 14 |
| CF3CH2CF2CH2CHF2 | 82 | 73 | 99 | 83 | 99 | 87 | 95 | 14 |
| CF3CHFCHFCH2CHF2 | 86.5 | 75 | 99 | 85 | 99 | 88 | 95 | 14 |
| CF3CHFCH2CHFCHF2 | 87.7 | 75 | 99 | 85 | 99 | 88 | 95 | 14 |
| CF3CH2CHFCHFCHF2 | 90.4 | 76 | 99 | 86 | 99 | 89 | 96 | 14 |
| CF3CH2CH2CHFCF3 | 72.9 | 70 | 99 | 80 | 99 | 85 | 94 | 14 |
| CF3CH2CHFCH2CF3 | 75.7 | 71 | 99 | 81 | 99 | 86 | 95 | 14 |
| CH2FCF2CF2CF2CH3 | 65.4 | 68 | 99 | 78 | 99 | 83 | 94 | 14 |
| CH2FCH2CF2CF2CHF2 | 79.7 | 73 | 99 | 83 | 99 | 87 | 95 | 14 |
| CH2FCF2CF2CH2CHF2 | 87.1 | 75 | 99 | 85 | 99 | 88 | 95 | 14 |
| CH2FCF2CH2CF2CHF2 | 87.2 | 75 | 99 | 85 | 99 | 88 | 95 | 14 |
| CH2FCHFCHFCF2CHF2 | 92.8 | 76 | 99 | 86 | 99 | 89 | 96 | 14 |
| CH2FCHFCF2CHFCHF2 | 95 | 77 | 99 | 87 | 99 | 90 | 96 | 14 |
| CH2FCF2CHFCHFCHF2 | 96.6 | 77 | 99 | 87 | 99 | 90 | 96 | 14 |
| CHF2CF2CF2CHFCH3 | 69.2 | 69 | 99 | 79 | 99 | 84 | 94 | 14 |
| CHF2CF2CHFCF2CH3 | 74.8 | 71 | 99 | 81 | 99 | 85 | 94 | 14 |
| CHF2CHFCF2CF2CH3 | 76.3 | 71 | 99 | 81 | 99 | 86 | 95 | 14 |
| CFH2CF2CHFCH2CHF2 | 91.9 | 76 | 99 | 86 | 99 | 89 | 96 | 14 |
| CHF2CHFCF2CH2CHF2 | 94.6 | 77 | 99 | 87 | 99 | 90 | 96 | 14 |
| CHF2CF2CH2CHFCHF2 | 93.6 | 76 | 99 | 86 | 99 | 90 | 96 | 14 |
| CHF2CHFCHFCHFCHF2 | 103.4 | 79 | 99 | 89 | 99 | 91 | 96 | 14 |
| CH2FCHFCF2CF2CH2F | 85.8 | 74 | 99 | 84 | 99 | 88 | 95 | 14 |
| CH2FCF2CHFCF2CH2F | 88.1 | 75 | 99 | 85 | 99 | 88 | 95 | 14 |
| CF3CH2CH2CF3 | 40.7 | 61 | 99 | 71 | 99 | 78 | 92 | 12 |
| CF3CHFCH2CHF2 | 50.8 | 66 | 99 | 76 | 99 | 82 | 93 | 12 |
| CF3CH2CHFCHF2 | 53 | 67 | 99 | 77 | 99 | 82 | 93 | 12 |
| CF3CF2CH2CH2F | 37.3 | 60 | 99 | 70 | 99 | 77 | 92 | 11 |
| CF3CHFCHFCH2F | 50.8 | 66 | 99 | 76 | 99 | 82 | 93 | 12 |
| CF3CH2CF2CH2F | 45.8 | 64 | 99 | 74 | 99 | 80 | 93 | 12 |
| CHF2CH2CF2CHF2 | 55.7 | 68 | 99 | 78 | 99 | 83 | 94 | 12 |
| CHF2CHFCHFCHF2 | 65.1 | 71 | 99 | 81 | 99 | 86 | 95 | 13 |
| CHF2CF2CHFCH2F | 55.3 | 68 | 99 | 78 | 99 | 83 | 94 | 13 |
| CHF2CHFCF2CH2F | 57.5 | 69 | 99 | 79 | 99 | 84 | 94 | 13 |
| CH2FCF2CF2CH2F | 49.2 | 65 | 99 | 75 | 99 | 81 | 93 | 12 |
| CHF2CF2CF2CH3 | 35.8 | 59 | 99 | 69 | 99 | 77 | 92 | 11 |
| CF3CF2CHFCH3 | 26 | 54 | 99 | 64 | 99 | 73 | 90 | 11 |
| CF3CHFCF2CH3 | 32 | 57 | 99 | 67 | 99 | 75 | 91 | 11 |
| CF3CHFCHFCF2CHFCH2F | 120.9 | 79 | 99 | 89 | 99 | 91 | 96 | 14 |
| CF3CH2CF2CF2CHFCH2F | 112.7 | 77 | 99 | 87 | 99 | 90 | 96 | 14 |
| CF3CF2CHFCH2CF2CH2F | 106.9 | 76 | 99 | 86 | 99 | 89 | 96 | 14 |
| CF3CHFCF2CH2CF2CH2F | 111.2 | 77 | 99 | 87 | 99 | 90 | 96 | 14 |
| CF3CF2CH2CHFCF2CH2F | 110.3 | 77 | 99 | 87 | 99 | 90 | 96 | 14 |
| CF3CHFCHFCHFCF2CH2F | 121.8 | 79 | 99 | 89 | 99 | 92 | 97 | 14 |
| CF3CH2CF2CFHCF2CH2F | 114.2 | 77 | 99 | 87 | 99 | 90 | 96 | 14 |
| CF3CHFCH2CF2CF2CH2F | 113.4 | 77 | 99 | 87 | 99 | 90 | 96 | 14 |
| CF3CH2CHFCF2CF2CH2F | 113.1 | 77 | 99 | 87 | 99 | 90 | 96 | 14 |
| CF3CHFCH2CF2CHFCHF2 | 120.9 | 79 | 99 | 89 | 99 | 91 | 96 | 14 |
| CF3CH2CHFCF2CHFCHF2 | 122.2 | 79 | 99 | 89 | 99 | 92 | 97 | 14 |
| CF2CF2CH2CH2CF2CHF2 | 104.6 | 75 | 99 | 85 | 99 | 89 | 96 | 14 |
| CF3CHFCHFCH2CF2CHF2 | 117.8 | 78 | 99 | 88 | 99 | 91 | 96 | 14 |
| CF3CH2CF2CH2CF2CHF2 | 112.4 | 77 | 99 | 87 | 99 | 90 | 96 | 14 |
| CF3CHFCH2CHFCF2CHF2 | 117.3 | 78 | 99 | 88 | 99 | 91 | 96 | 14 |
| CF3CH2CH2CF2CF2CHF2 | 107.3 | 76 | 99 | 86 | 99 | 89 | 96 | 14 |
| CF3CH2CHFCHFCF2CHF2 | 119.2 | 79 | 99 | 89 | 99 | 91 | 96 | 14 |
| CF3CF2CF2CF2CH2CH3 | 71.4 | 65 | 99 | 75 | 99 | 81 | 93 | 14 |
| CF3CF2CF2CHFCHFCH3 | 86 | 70 | 99 | 80 | 99 | 85 | 94 | 14 |
| CF3CF2CHFCF2CHFCH3 | 93.5 | 72 | 99 | 82 | 99 | 86 | 95 | 14 |
| CF3CHFCF2CF2CHFCH3 | 94.9 | 73 | 99 | 83 | 99 | 87 | 95 | 14 |
| CF3CF2CF2CH2CF2CH3 | 82.8 | 69 | 99 | 79 | 99 | 84 | 94 | 14 |
| CF3CF2CHFCHFCF2CH3 | 97.5 | 73 | 99 | 83 | 99 | 87 | 95 | 14 |
| CF3CHFCF2CHFCF2CH3 | 99.6 | 74 | 99 | 84 | 99 | 88 | 95 | 14 |
| CF3CF2CH2CF2CF2CH3 | 93 | 72 | 99 | 82 | 99 | 86 | 95 | 14 |
| CF3CHFCHFCF2CF2CH3 | 102.3 | 75 | 99 | 85 | 99 | 88 | 95 | 14 |
| CF3CH2CF2CF2CF2CH3 | 92.4 | 72 | 99 | 82 | 99 | 86 | 95 | 14 |
| CHF2CF2CF2CHFCH2CHF2 | 117.8 | 78 | 99 | 88 | 99 | 91 | 96 | 14 |
| CHF2CF2CHFCF2CH2CHF2 | 122.4 | 79 | 99 | 89 | 99 | 92 | 97 | 14 |
| CHF2CHFCF2CF2CH2CHF2 | 123.1 | 79 | 99 | 89 | 99 | 92 | 97 | 14 |
| CF3CF2CHFCH2CHFCHF2 | 120.4 | 79 | 99 | 89 | 99 | 91 | 96 | 14 |
| CHF2CF2CHFCHFCHFCHF2 | 132.1 | 81 | 99 | 91 | 99 | 93 | 97 | 14 |
| CHF2CHFCF2CHFCHFCHF2 | 133.5 | 81 | 99 | 91 | 99 | 93 | 97 | 14 |
| CHF2CF2CH2CF2CHFCHF2 | 124.9 | 80 | 99 | 90 | 99 | 92 | 97 | 14 |

TABLE 4-continued

| 245fa azeotropes at 25° C. NBP = 15.3° C. STRUCTURE | VP = 1.43 atm est. BP (° C.) | 245fa Preferred Compositions wt. % | | 245fa More Preferred Compositions wt. % | | 245fa Most Preferred Compositions wt. % | | Azeo NBP (° C.) |
|---|---|---|---|---|---|---|---|---|
| | | Lower | Upper | Lower | Upper | Lower | Upper | (±1) |
| CHF2CF2CHFCH2CF2CHF2 | 123.1 | 79 | 99 | 89 | 99 | 92 | 97 | 14 |
| CHF2CF2CF2CF2CH2CH2F | 104.8 | 75 | 99 | 85 | 99 | 89 | 96 | 14 |
| CHF2CF2CF2CHFCHFCH2F | 118.7 | 78 | 99 | 88 | 99 | 91 | 96 | 14 |
| CHF2CF2CHFCF2CHFCH2F | 122.9 | 79 | 99 | 89 | 99 | 92 | 97 | 14 |
| CHF2CHFCF2CF2CHFCH2F | 121.8 | 79 | 99 | 89 | 99 | 92 | 97 | 14 |
| CHF2CF2CF2CH2CF2CH2F | 114.1 | 77 | 99 | 87 | 99 | 90 | 96 | 14 |
| CHF2CF2CHFCHFCF2CH2F | 125.4 | 80 | 99 | 90 | 99 | 92 | 97 | 14 |
| CHF2CHFCF2CHFCF2CH2F | 125 | 80 | 99 | 90 | 99 | 92 | 97 | 14 |
| CHF2CF2CH2CF2CF2CH2F | 117.5 | 78 | 99 | 88 | 99 | 91 | 96 | 14 |
| CHF2CHFCHFCF2CF2CH2F | 124.2 | 80 | 99 | 90 | 99 | 92 | 97 | 14 |
| CHF2CH2CF2CF2CF2CH2F | 112.2 | 77 | 99 | 87 | 99 | 90 | 96 | 14 |
| CF2HCF2CF2CF2CHFCH3 | 94.4 | 72 | 99 | 82 | 99 | 87 | 95 | 14 |
| CF2HCF2CF2CHFCF2CH3 | 100.8 | 74 | 99 | 84 | 99 | 88 | 95 | 14 |
| CHF2CF2CHFCF2CF2CH3 | 104.2 | 75 | 99 | 85 | 99 | 89 | 96 | 14 |
| CHF2CHFCF2CF2CF2CH3 | 101.4 | 74 | 99 | 84 | 99 | 88 | 95 | 14 |
| CH2FCF2CF2CF2CF2CH3 | 90.6 | 71 | 99 | 81 | 99 | 86 | 95 | 14 |
| CH2FCF2CF2CF2CHFCH2F | 110.9 | 77 | 99 | 87 | 99 | 90 | 96 | 14 |
| CH2FCF2CF2CHFCF2CH2F | 115.9 | 78 | 99 | 88 | 99 | 91 | 96 | 14 |
| CF3CH2CH2CHFCF2CF3 | 96.7 | 73 | 99 | 83 | 99 | 87 | 95 | 14 |
| CF3CH2CH2CF2CHFCF3 | 104.4 | 75 | 99 | 85 | 99 | 89 | 96 | 14 |
| CF3CF2CH2CHFCH2CF3 | 100.7 | 74 | 99 | 84 | 99 | 88 | 95 | 14 |
| CF3CHFCHFCHFCH2CF3 | 115.5 | 78 | 99 | 88 | 99 | 91 | 96 | 14 |
| CF3CH2CF2CHFCH2CF3 | 111.4 | 77 | 99 | 87 | 99 | 90 | 96 | 14 |
| CF3CHFCH2CF2CH2CF3 | 108.4 | 76 | 99 | 86 | 99 | 89 | 96 | 14 |
| CF3CHFCH2CH2CF2CF3 | 97.1 | 73 | 99 | 83 | 99 | 87 | 95 | 14 |
| CF3CHFCHFCH2CHFCF3 | 112 | 77 | 99 | 87 | 99 | 90 | 96 | 14 |
| CF3CF2CF2CH2CH2CHF2 | 95.9 | 73 | 99 | 83 | 99 | 87 | 95 | 14 |
| CF3CF2CHFCHFCH2CHF2 | 111.2 | 77 | 99 | 87 | 99 | 90 | 96 | 14 |
| CF3CHFCF2CHFCH2CHF2 | 116.6 | 78 | 99 | 88 | 99 | 91 | 96 | 14 |
| CF3CF2CH2CF2CH2CHF2 | 107.9 | 76 | 99 | 86 | 99 | 89 | 96 | 14 |
| CF3CHFCHFCF2CH2CHF2 | 120.5 | 79 | 99 | 89 | 99 | 91 | 96 | 14 |
| CF3CH2CF2CF2CF2CHF2 | 114 | 77 | 99 | 87 | 99 | 90 | 96 | 14 |
| CF3CF2CHFCH2CHFCHF2 | 111.5 | 77 | 99 | 87 | 99 | 90 | 96 | 14 |
| CF3CF2CHFCH2CHFCHF2 | 117.4 | 78 | 99 | 88 | 99 | 91 | 96 | 14 |
| CF3CF2CH2CHFCHFCHF2 | 115.4 | 78 | 99 | 88 | 99 | 91 | 96 | 14 |
| CF3CHFCHFCHFCHFCHF2 | 128.5 | 80 | 99 | 90 | 99 | 93 | 97 | 14 |
| CF3CH2CF2CHFCHFCHF2 | 122.7 | 79 | 99 | 89 | 99 | 92 | 97 | 14 |
| CF3CF2CF2CHFCH2CH2F | 94.3 | 72 | 99 | 82 | 99 | 87 | 95 | 14 |
| CF3CF2CHFCF2CH2CH2F | 102.3 | 75 | 99 | 85 | 99 | 88 | 95 | 14 |
| CF3CHFCF2CF2CH2CH2F | 105.3 | 75 | 99 | 85 | 99 | 89 | 96 | 14 |
| CF3CF2CF2CH2CHFCH2F | 98.6 | 74 | 99 | 84 | 99 | 87 | 95 | 14 |
| CF3CF2CHFCHFCHFCH2F | 113.8 | 77 | 99 | 87 | 99 | 90 | 96 | 14 |
| CF3CHFCF2CHFCHFCH2F | 117.5 | 78 | 99 | 88 | 99 | 91 | 96 | 14 |
| CF3CF2CH2CF2CHFCH2F | 110 | 76 | 99 | 86 | 99 | 90 | 96 | 14 |
| CH3CHFCF2CF2CF3 | 50.2 | 60 | 99 | 70 | 99 | 77 | 92 | 12 |
| CH3CF2CFHCF2CF3 | 57.5 | 63 | 99 | 73 | 99 | 79 | 92 | 12 |
| CH3CF2CF2CHFCF3 | 60.9 | 64 | 99 | 74 | 99 | 80 | 93 | 13 |
| CH2FCH2CF2CF2CF3 | 60.7 | 64 | 99 | 74 | 99 | 80 | 93 | 13 |
| CH2FCHFCHFCF2CF3 | 75.5 | 69 | 99 | 79 | 99 | 84 | 94 | 14 |
| CH2FCHFCF2CHFCF3 | 80.1 | 71 | 99 | 81 | 99 | 85 | 94 | 14 |
| CH2FCF2CH2CF2CF3 | 71.6 | 68 | 99 | 78 | 99 | 83 | 94 | 14 |
| CH2FCF2CHFCHFCF3 | 83.5 | 72 | 99 | 82 | 99 | 86 | 95 | 14 |
| CH2FCF2CF2CH2CF3 | 76.1 | 70 | 99 | 80 | 99 | 84 | 94 | 14 |
| CF2HCH2CHFCF2CF3 | 74.6 | 69 | 99 | 79 | 99 | 84 | 94 | 14 |
| CF2HCH2CF2CHFCF3 | 79.7 | 71 | 99 | 81 | 99 | 85 | 94 | 14 |
| CF2HCHFCH2CF2CF3 | 77.9 | 70 | 99 | 80 | 99 | 85 | 94 | 14 |
| CF2HCHFCHFCHFCF3 | 90.2 | 74 | 99 | 84 | 99 | 88 | 95 | 14 |
| CF2HCHFCF2CH2CF3 | 83.5 | 72 | 99 | 82 | 99 | 86 | 95 | 14 |
| CF2HCF2CH2CFHCF3 | 82 | 71 | 99 | 81 | 99 | 86 | 95 | 14 |
| CF2HCF2CHFCH2CF3 | 82.6 | 72 | 99 | 82 | 99 | 86 | 95 | 14 |
| CF3CH2CH2CF2CF3 | 64.8 | 66 | 99 | 76 | 99 | 81 | 93 | 14 |
| CF3CH2CHFCHFCF3 | 77.2 | 70 | 99 | 80 | 99 | 85 | 94 | 14 |
| CF3CH2CF2CH2CF3 | 71 | 68 | 99 | 78 | 99 | 83 | 94 | 14 |
| CF3CHFCH2CHFCF3 | 76.2 | 70 | 99 | 80 | 99 | 84 | 94 | 14 |
| CH2FCF2CHFCF2CF2H | 85.4 | 73 | 99 | 83 | 99 | 87 | 95 | 14 |
| CH2FCF2CF2CHFCF2H | 85.2 | 72 | 99 | 82 | 99 | 87 | 95 | 14 |
| CH2FCHFCF2CF2CF2H | 81.3 | 71 | 99 | 81 | 99 | 86 | 95 | 14 |
| CH3CF2CF2CF2CF2H | 60.9 | 64 | 99 | 74 | 99 | 80 | 93 | 14 |
| CF2HCH2CF2CF2CF2H | 82.6 | 72 | 99 | 82 | 99 | 86 | 95 | 14 |
| CF2HCHFCHFCHFCF2H | 93.8 | 75 | 99 | 85 | 99 | 88 | 95 | 14 |
| CF2HCHFCF2CHFCF2H | 94.3 | 75 | 99 | 85 | 99 | 89 | 96 | 14 |
| CF2HCF2CH2CF2CF2H | 86.1 | 73 | 99 | 83 | 99 | 87 | 95 | 14 |
| CH2FCF2CF2CF2CH2F | 74.3 | 69 | 99 | 79 | 99 | 84 | 94 | 14 |

TABLE 4-continued

| 245fa azeotropes at 25° C. NBP = 15.3° C. STRUCTURE | VP = 1.43 atm est. BP (° C.) | 245fa Preferred Compositions wt. % | | 245fa More Preferred Compositions wt. % | | 245fa Most Preferred Compositions wt. % | | Azeo NBP (° C.) (±1) |
|---|---|---|---|---|---|---|---|---|
| | | Lower | Upper | Lower | Upper | Lower | Upper | |
| CF3CF2CF2CH2CH2CF3 | 88.3 | 69 | 99 | 79 | 99 | 84 | 94 | 14 |
| CF3CF2CHFCHFCH2CF3 | 101.9 | 73 | 99 | 83 | 99 | 87 | 95 | 14 |
| CF3CHFCF2CHFCH2CF3 | 107.3 | 75 | 99 | 85 | 99 | 88 | 95 | 14 |
| CF3CF2CH2CF2CH2CF3 | 96.9 | 72 | 99 | 82 | 99 | 86 | 95 | 14 |
| CF3CHFCHFCF2CH2CF3 | 109.5 | 75 | 99 | 85 | 99 | 89 | 96 | 14 |
| CF3CH2CF2CF2CH2CF3 | 103 | 73 | 99 | 83 | 99 | 87 | 95 | 14 |
| CF3CHFCH2CHFCF2CF3 | 100 | 73 | 99 | 83 | 99 | 87 | 95 | 14 |
| CH3CHFCH2CF2CHFCF3 | 10.6 | 34 | 99 | 44 | 99 | 58 | 85 | 14 |
| CF3CHFCHFCH2CF2CF3 | 102.2 | 73 | 99 | 83 | 99 | 87 | 95 | 14 |
| CF3CHFCHFCHFCHFCF3 | 115.3 | 76 | 99 | 86 | 99 | 90 | 96 | 14 |
| CF3CF2CH2CH2CF2CF3 | 89 | 69 | 99 | 79 | 99 | 84 | 94 | 14 |
| CF3CF2CF2CHFCH2CHF2 | 98.8 | 72 | 99 | 82 | 99 | 86 | 95 | 14 |
| CF3CF2CHFCF2CH2CHF2 | 105.1 | 74 | 99 | 84 | 99 | 88 | 95 | 14 |
| CF3CHFCF2CF2CHFCHF2 | 108.2 | 75 | 99 | 85 | 99 | 88 | 95 | 14 |
| CF3CF2CF2CH2CHFCHF2 | 101.4 | 73 | 99 | 83 | 99 | 87 | 95 | 14 |
| CF3CF2CHFCHFCHFCHF2 | 114.8 | 76 | 99 | 86 | 99 | 89 | 96 | 14 |
| CF3CHFCF2CHFCHFCHF2 | 118.6 | 77 | 99 | 87 | 99 | 90 | 96 | 14 |
| CF3CF2CH2CF2CHFCHF2 | 109.4 | 75 | 99 | 85 | 99 | 89 | 96 | 14 |
| CF3CHFCHFCF2CHFCHF2 | 120.3 | 78 | 99 | 88 | 99 | 90 | 96 | 14 |
| CF3CH2CF2CF2CHFCHF2 | 112.1 | 76 | 99 | 86 | 99 | 89 | 96 | 14 |
| CF3CF2CHFCH2CF2CHF2 | 105.8 | 74 | 99 | 84 | 99 | 88 | 95 | 14 |
| CF3CHFCF2CH2CF2CHF2 | 110.1 | 75 | 99 | 85 | 99 | 89 | 96 | 14 |
| CF3CF2CH2CHFCF2CHF2 | 107.5 | 75 | 99 | 85 | 99 | 88 | 95 | 14 |
| CF3CHFCHFCHFCF2CHF2 | 118.9 | 77 | 99 | 87 | 99 | 90 | 96 | 14 |
| CF3CH2CF2CHFCF2CHF2 | 111.4 | 76 | 99 | 86 | 99 | 89 | 96 | 14 |
| CF3CHFCH2CF2CF2CHF2 | 108.9 | 75 | 99 | 85 | 99 | 88 | 95 | 14 |
| CF3CH2CHFCF2CF2CHF2 | 108.5 | 75 | 99 | 85 | 99 | 88 | 95 | 14 |
| CF3CF2CF2CF2CH2CH2F | 85.8 | 68 | 99 | 78 | 99 | 83 | 94 | 14 |
| CF3CF2CF2CHFCHFCH2F | 99.7 | 73 | 99 | 83 | 99 | 87 | 95 | 14 |
| CF3CF2CHFCF2CHFCH2F | 105.6 | 74 | 99 | 84 | 99 | 88 | 95 | 14 |
| CF3CHFCF2CF2CHFCH2F | 106.9 | 74 | 99 | 84 | 99 | 88 | 95 | 14 |
| CF3CF2CF2CH2CF2CH2F | 95.1 | 71 | 99 | 81 | 99 | 86 | 95 | 14 |
| CF3CF2CHFCHFCF2CH2F | 108.1 | 75 | 99 | 85 | 99 | 88 | 95 | 14 |
| CF3CHFCF2CHFCF2CH2F | 110.1 | 75 | 99 | 85 | 99 | 89 | 96 | 14 |
| CF3CF2CH2CF2CF2CH2F | 101.9 | 73 | 99 | 83 | 99 | 87 | 95 | 14 |
| CF3CHFCHFCF2CF2CH2F | 111.4 | 76 | 99 | 86 | 99 | 89 | 96 | 14 |
| CHF2CF2CHFCF2CF2CH2F | 101.2 | 73 | 99 | 83 | 99 | 87 | 95 | 14 |
| CF3CF2CF2CF2CHFCH3 | 75.4 | 65 | 99 | 75 | 99 | 81 | 93 | 14 |
| CF3CF2CF2CHFCF2CH3 | 81.8 | 67 | 99 | 77 | 99 | 83 | 94 | 14 |
| CF3CF2CHFCF2CF2CH3 | 86.9 | 69 | 99 | 79 | 99 | 84 | 94 | 14 |
| CF3CHFCF2CF2CF2CH3 | 86.6 | 69 | 99 | 79 | 99 | 84 | 94 | 14 |
| CHF2CF2CF2CHFCHFCHF2 | 119.8 | 77 | 99 | 87 | 99 | 90 | 96 | 14 |
| CHF2CF2CHFCF2CHFCHF2 | 122.2 | 78 | 99 | 88 | 99 | 91 | 96 | 14 |
| CHF2CHFCF2CF2CHFCHF2 | 121.2 | 78 | 99 | 88 | 99 | 91 | 96 | 14 |
| CHF2CF2CF2CH2CF2CHF2 | 113 | 76 | 99 | 86 | 99 | 89 | 96 | 14 |
| CHF2CF2CHFCHFCF2CHF2 | 122.6 | 78 | 99 | 88 | 99 | 91 | 96 | 14 |
| CHF2CH2CF2CF2CF2CHF2 | 107.7 | 75 | 99 | 85 | 99 | 88 | 95 | 14 |
| CHF2CF2CF2CF2CHFCH2F | 106.4 | 74 | 99 | 84 | 99 | 88 | 95 | 14 |
| CHF2CF2CF2CHFCF2CH2F | 111.4 | 76 | 99 | 86 | 99 | 89 | 96 | 14 |
| CHF2CF2CHFCF2CF2CH2F | 113.1 | 76 | 99 | 86 | 99 | 89 | 96 | 14 |
| CHF2CHFCF2CF2CF2CH2F | 110.3 | 75 | 99 | 85 | 99 | 89 | 96 | 14 |
| CH2FCF2CF2CF2CF2CH2F | 99.4 | 72 | 99 | 82 | 99 | 87 | 95 | 14 |
| CHFCF2CF2CF2CF2CH3 | 86.1 | 68 | 99 | 78 | 99 | 84 | 94 | 14 |
| CH3CF2CF2CF3 | 16.8 | 46 | 99 | 56 | 99 | 67 | 88 | 9 |
| CH2FCHFCF2CF3 | 38 | 58 | 99 | 68 | 99 | 76 | 91 | 11 |
| CH2FCF2CHFCF3 | 42.6 | 60 | 99 | 70 | 99 | 77 | 92 | 11 |
| CH2FCF2CH2CF3 | 44.7 | 61 | 99 | 71 | 99 | 78 | 92 | 11 |
| CF2HCH2CF2CF3 | 40.2 | 59 | 99 | 69 | 99 | 76 | 91 | 11 |
| CF2HCHFCHFCF3 | 51.9 | 64 | 99 | 74 | 99 | 80 | 93 | 11 |
| CF3CH2CHFCF3 | 41.5 | 59 | 99 | 69 | 99 | 77 | 92 | 11 |
| CH2FCF2CF2CF2H | 44.7 | 61 | 99 | 71 | 99 | 78 | 92 | 11 |
| CF2HCHFCF2CF2H | 54.7 | 65 | 99 | 75 | 99 | 81 | 93 | 12 |
| CF3CF2CHFCH2CF3 | 65.3 | 64 | 99 | 74 | 99 | 80 | 93 | 13 |
| CF3CH2CF2CHFCF3 | 68.6 | 65 | 99 | 75 | 99 | 81 | 93 | 13 |
| CF3CHFCH2CF2CF3 | 66.5 | 64 | 99 | 74 | 99 | 81 | 93 | 13 |
| CF3CHFCHFCHFCF3 | 77 | 68 | 99 | 78 | 99 | 83 | 94 | 13 |
| CF3CH2CF2CF2CHF2 | 71.6 | 66 | 99 | 76 | 99 | 82 | 93 | 13 |
| CF3CHFCHFCF2CHF2 | 80.6 | 69 | 99 | 79 | 99 | 84 | 94 | 13 |
| CF3CF2CH2CF2CHF2 | 70.5 | 66 | 99 | 76 | 99 | 82 | 93 | 13 |
| CF3CHFCF2CHFCHF2 | 79.5 | 69 | 99 | 79 | 99 | 84 | 94 | 13 |
| CF3CF2CHFCHFCHF2 | 76.5 | 68 | 99 | 78 | 99 | 83 | 94 | 13 |
| CF3CF2CF2CH2CHF2 | 63.6 | 63 | 99 | 73 | 99 | 80 | 93 | 13 |
| CF3CF2CF2CHFCH2F | 62.3 | 63 | 99 | 73 | 99 | 79 | 92 | 13 |

TABLE 4-continued

| 245fa azeotropes at 25° C. NBP = 15.3° C. STRUCTURE | VP = 1.43 atm est. BP (° C.) | 245fa Preferred Compositions wt. % | | 245fa More Preferred Compositions wt. % | | 245fa Most Preferred Compositions wt. % | | Azeo NBP (° C.) (±1) |
|---|---|---|---|---|---|---|---|---|
| | | Lower | Upper | Lower | Upper | Lower | Upper | |
| CF3CF2CHFCF2CH2F | 68.1 | 65 | 99 | 75 | 99 | 81 | 93 | 13 |
| CF3CHFCF2CF2CH2F | 703 | 66 | 99 | 76 | 99 | 82 | 93 | 13 |
| CF3CF2CF2CF2CH3 | 41.9 | 54 | 99 | 64 | 99 | 73 | 90 | 13 |
| CHF2CF2CF2CHFCHF2 | 80.7 | 69 | 99 | 79 | 99 | 84 | 94 | 13 |
| CHF2CF2CHFCF2CHF2 | 82.6 | 70 | 99 | 80 | 99 | 85 | 94 | 13 |
| CHF2CF2CF2CF2CH2F | 69.8 | 66 | 99 | 76 | 99 | 81 | 93 | 13 |
| CH3(CF2)4CF3 | 67.1 | 60 | 99 | 70 | 99 | 77 | 92 | 14 |
| CH2FCHF(CF2)3CF3 | 87.4 | 67 | 99 | 77 | 99 | 83 | 94 | 14 |
| CH2FCF2CHFCF2CF3 | 92.3 | 69 | 99 | 79 | 99 | 84 | 94 | 14 |
| CH2FCF2CF2CHFCF2CF3 | 95.8 | 70 | 99 | 80 | 99 | 85 | 94 | 14 |
| CH2F(CF2)3CHFCF3 | 95.4 | 70 | 99 | 80 | 99 | 85 | 94 | 14 |
| CF2HCH2(CF2)3CF3 | 88.7 | 68 | 99 | 78 | 99 | 83 | 94 | 14 |
| CF2HCHFCHFCF2CF2CF3 | 100.8 | 71 | 99 | 81 | 99 | 86 | 95 | 14 |
| CF2HCHFCF2CHFCF2CF3 | 104.9 | 73 | 99 | 83 | 99 | 87 | 95 | 14 |
| CF2HCHFCF2CF2CHFCF3 | 106.3 | 73 | 99 | 83 | 99 | 87 | 95 | 14 |
| CF2HCF2CH2CF2CF2CF3 | 94 | 69 | 99 | 79 | 99 | 84 | 94 | 14 |
| CF2HCF2CHFCHFCF2CF3 | 105.3 | 73 | 99 | 83 | 99 | 87 | 95 | 14 |
| CF2HCF2CHFCF2CHFCF3 | 107.3 | 73 | 99 | 83 | 99 | 87 | 95 | 14 |
| CF2HCF2CF2CH2CF2CF3 | 97.4 | 71 | 99 | 81 | 99 | 85 | 94 | 14 |
| CF2HCF2CF2CHFCHFCF3 | 106.6 | 73 | 99 | 83 | 99 | 87 | 95 | 14 |
| CF2H(CF2)3CH2CF3 | 96.7 | 70 | 99 | 80 | 99 | 85 | 94 | 14 |
| CF3CH2CHFCF2CF2CF3 | 89.5 | 68 | 99 | 78 | 99 | 83 | 94 | 14 |
| CF3CH2CF2CHFCF2CF3 | 84.1 | 70 | 99 | 80 | 99 | 84 | 94 | 14 |
| CF3CHFCF2CF2CH2CF3 | 97.2 | 70 | 99 | 80 | 99 | 85 | 94 | 14 |
| CF3CF2CF2CH2CHFCF3 | 89.9 | 68 | 99 | 78 | 99 | 83 | 94 | 14 |
| CF3CHFCHFCHFCF2CF3 | 101.6 | 72 | 99 | 82 | 99 | 86 | 95 | 14 |
| CF3CHFCF2CHFCHFCF3 | 105.4 | 73 | 99 | 83 | 99 | 87 | 95 | 14 |
| CF3CHFCF2CH2CF2CF3 | 94.5 | 70 | 99 | 80 | 99 | 94 | 94 | 14 |
| CF3CF2CH2CHFCF2CF3 | 90.2 | 68 | 99 | 78 | 99 | 83 | 94 | 14 |
| CH2F(CF2)4CF2H | 94.9 | 70 | 99 | 80 | 99 | 85 | 94 | 14 |
| CF2HCHF(CF2)3CF2H | 105.8 | 73 | 99 | 83 | 99 | 87 | 95 | 14 |
| CF2HCF2CHFCF2CF2CF2H | 108.5 | 74 | 99 | 84 | 99 | 87 | 95 | 14 |
| CF3CHFCHFCF3 | 38.7 | 56 | 99 | 66 | 99 | 74 | 91 | 11 |
| CF3CF2CF2CH2F | 25.7 | 49 | 99 | 59 | 99 | 69 | 89 | 10 |
| CF3CF2CHFCHF2 | 37.4 | 55 | 99 | 65 | 99 | 74 | 91 | 11 |
| CF3CHFCF2CHF2 | 39.8 | 56 | 99 | 66 | 99 | 74 | 91 | 11 |
| CF3CF2CH2CHF2 | 29.1 | 51 | 99 | 61 | 99 | 70 | 89 | 11 |
| CHF2CF2CF2CHF2 | 40.1 | 56 | 99 | 66 | 99 | 75 | 91 | 11 |
| CH2FCF2CF2CH2CF3 | 50.8 | 56 | 99 | 66 | 99 | 74 | 91 | 13 |
| CF2HCHFCF2CF2CF3 | 61.7 | 61 | 99 | 71 | 99 | 78 | 92 | 14 |
| CF2HCHF2CHFCF2CF3 | 65.3 | 62 | 99 | 72 | 99 | 79 | 92 | 14 |
| CF2HCF2CF2CHFCF3 | 65.8 | 62 | 99 | 72 | 99 | 79 | 92 | 14 |
| CF3CH2CF2CF2CF3 | 52.6 | 57 | 99 | 67 | 99 | 75 | 91 | 14 |
| CF3CF2CHFCHFCF3 | 63.3 | 61 | 99 | 71 | 99 | 78 | 92 | 14 |
| CF3CHFCF2CHFCF3 | 64.6 | 62 | 99 | 72 | 99 | 79 | 92 | 14 |
| CF3CF2CH2CF2CF3 | 55 | 58 | 99 | 68 | 99 | 76 | 91 | 14 |
| CF2HCF2CF2CF2CF2H | 65.3 | 62 | 99 | 72 | 99 | 79 | 92 | 14 |
| CF3CF2CHFCHFCF2CF3 | 88 | 66 | 99 | 76 | 99 | 82 | 93 | 14 |
| CF3CF2CF2CH2CF2CF3 | 78.4 | 63 | 99 | 73 | 99 | 79 | 92 | 14 |
| CF3CHFCF2CF2CHFCF3 | 91.4 | 67 | 99 | 77 | 99 | 83 | 94 | 14 |
| CF3CF2CHFCF2CHFCF3 | 90 | 67 | 99 | 77 | 99 | 82 | 93 | 14 |
| CF3CHFCHFCF2CF2CF3 | 87.6 | 66 | 99 | 76 | 99 | 82 | 93 | 14 |
| CF3CF2CF2CF2CH2CF3 | 77.7 | 63 | 99 | 73 | 99 | 79 | 92 | 14 |
| CF3CF2CF2CF2CHFCHF2 | 86.8 | 66 | 99 | 76 | 99 | 82 | 93 | 14 |
| CF3CF2CF2CHFCF2CHF2 | 89.5 | 67 | 99 | 77 | 99 | 82 | 93 | 14 |
| CF3CHFCF2CF2CF2CHF2 | 91.2 | 67 | 99 | 77 | 99 | 83 | 94 | 14 |
| CF3CHFCF2CF2CF2CHF2 | 90.9 | 67 | 99 | 77 | 99 | 83 | 94 | 14 |
| CF3CF2CF2CF2CF2CH2F | 75.9 | 62 | 99 | 72 | 99 | 79 | 92 | 14 |
| CF2HCF2CF2CF2CF2CHF2 | 90.4 | 67 | 99 | 77 | 99 | 83 | 94 | 14 |
| CF2HCF2CF2CF2CF2CF3 | 71.4 | 59 | 99 | 69 | 99 | 76 | 91 | 14 |
| CF3HCF2CF2CF2CF3 | 71.9 | 59 | 99 | 69 | 99 | 77 | 92 | 14 |
| CF3CF2CHFCF2CF2CF3 | 72.2 | 59 | 99 | 69 | 99 | 77 | 92 | 14 |
| CF2HCF2CF2CF3 | 21.1 | 44 | 99 | 54 | 95 | 65 | 85 | 10 |
| CF3CHFCF2CF3 | 22.5 | 45 | 99 | 55 | 95 | 65 | 85 | 10 |
| CF2HCF2CF3 | −3.14 | 36 | 90 | 46 | 85 | 56 | 75 | −7 |
| CF3CHFCF3 | −2.99 | 37 | 90 | 47 | 85 | 56 | 75 | −7 |

EXAMPLE 1

This example shows that constant boiling HFC-245 and hydrofluorocarbon blends have certain advantages when compared to other refrigerants currently used in certain refrigeration cycles. The theoretical performance of a refrigerant at specific operating conditions nay be estimated from the thermodynamic performance of a refrigerant using standard refrigeration cycle analysis techniques. See R. C.

Downing, *Fluorocarbon Refrigerants Handbook,* Chapter 3, Prentice-Hall, 1988. The coefficient of performance, COP, is a universally accepted measure especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing vapor. The capacity of a refrigerant represents the volume efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

This type of calculation is performed for Blend 1, HFC-245ca and $CF_3CH_2CHFCF_3$, and Blend 2, HFC-245fa and $CF_2HCHFCHFCF_3$. Table 5 lists the COP and capacity of the various blends at typical chiller conditions in a saturated cycle and at 40° F. evaporator temperature and 100° F. condensing temperature and a compressor efficiency of 80% and a displacement of 1000 cubic feet per hour.

TABLE 5

|  | COP | Capacity (BTU/hr) |
|---|---|---|
| Blend 1 | 5.57 | 11,577 |
| Blend 2 | 5.90 | 11,463 |

As can be seen, the HFC-245 compositions of this invention are useful refrigerants.

In addition to being minimally segregating, the compositions of this invention overcome the potential drawbacks of the single component refrigerants in that the present blends likely will not exhibit flame limits when tested in air at ambient conditions using the ASTM E-681 method as specified in the american Society of Heating, Refrigerating and Air Conditioning Engineers (ASHRAE) Standard 34-1992.

While only a few embodiments of the invention have been shown and described herein, it will become apparent to those skilled in the art that various modifications and changes can be made in the present invention to azeotropic-like mixtures of fluorinated organic compounds and their use in heating and cooling and as blowing agents in polymers. All such modification and changes coming within the scope of the appended claims are intended to be carried out thereby.

We claim:

1. A process to cool a region or object using a vapor compression cycle, which process comprises:
   (A) condensing a refrigerant mixture heating or cooling equipment to produce a liquid in a first region followed by dissipation of the heat generated;
   (B) transferring the condensed refrigerant mixture of step (A) to a second region or object to be cooled;
   (C) evaporating the condensed refrigerant mixture in the second region or object, which results in cooling of the second region or object; and
   (D) optionally transferring the evaporated refrigerant mixture to the first region of step (A) to be condensed and recycled, wherein said refrigerant mixture is an azeotrop-like mixture, which mixture comprises:
   (a) pentafluoropropane; and
   (b) a hydrofluorocarbon of the formula;
   $C_xF_yH_z$ wherein X is 3, 4, 5 or 6 and y and z are each independently 1 or a positive whole number such that the result of y / (y+z) is greater than 0.67.

2. The process of claim 1 wherein the pentafluoropropane is selected from 1,1,2,2,3-pentafluoropropane; 1,1,2,3,3-pentafluoropropane; 1,1,1,2,3-pentafluoropropane; 1,1,1,3,3-pentafluoropropane; or mixtures thereof.

3. The process of claim 2 wherein the pentafluoropropane is selected from 1,1,2,2,3-pentafluoropropane or 1,1,1,2,2-pentafluoropropane.

4. The process of claim 2 wherein the pentafluoropropane is 1,1,1,3,3-pentafluoropropane.

5. The process of claim 2 wherein the pentafluoropropane is 1,1,2,2,3-pentafluoropropane.

6. The process of claim 2 wherein the pentafluoropropane is 1,1,2,3,3-pentafluoropropane.

7. A process to heat a region or object using a vapor compression cycle, which process comprises;
   (A') condensing a refrigerant mixture heating or cooling equipment in a first region or object to be heated;
   (B') transferring the condensed refrigerant mixture of step (A') to a second region;
   (C') evaporating the condensed refrigerant mixture of step (B') and dissipating the heat product; and
   (D') optionally transferring the evaporated refrigerant mixture to step (C') to the first region or object of Step (A') to be recondensed and recycled, wherein said refrigerant mixture is an azeotrope-like mixture, which mixture comprises:
   (a) pentafluoropropane; and
   (b) a hydrofluorocarbon of the formula;
   $C_xF_yH_z$ wherein X is 3, 4, 5 or 6 and y and z are each independently 1 or a positive whole number such that the result of y / (y+z) is greater than 0.67.

8. The process of claim 7 wherein the pentafluoropropane is selected from 1,1,2,2,3-pentafluoropropane; 1,1,2,3,3-pentafluoropropane; 1,1,1,2,3-pentafluoropropane; 1,1,3,3-pentafluoropropane; or mixtures thereof.

9. The process of claim 8 wherein the pentafluoropropane is selected from 1,1,2,2,3-pentafluoropropane or 1,1,1,2,2-pentafluoropropane.

10. The process of claim 8 wherein the pentafluoropropane is 1,1,1,3,3-pentafluoropropane.

11. The process of claim 8 wherein the pentafluoropropane is 1,1,2,2,3-pentafluoropropane.

12. The process of claim 8 wherein the pentafluoropropane is 1,1,2,3,3-pentafluoropropane.

* * * * *